United States Patent
Schwarz et al.

(10) Patent No.: US 11,215,850 B2
(45) Date of Patent: * Jan. 4, 2022

(54) METHOD, DEVICE, AND COMPUTER PROGRAM FOR THE VIRTUAL FITTING OF A SPECTACLE FRAME

(71) Applicant: Carl Zeiss Vision International GmbH, Aalen (DE)

(72) Inventors: Oliver Schwarz, Ellwangen (DE); Tobias Breuninger, Riederich (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,473

(22) Filed: Jun. 22, 2020

(65) Prior Publication Data

US 2020/0319482 A1 Oct. 8, 2020

Related U.S. Application Data

(63) Continuation of application No. 16/734,262, filed on Jan. 3, 2020, which is a continuation of application No. PCT/EP2018/068222, filed on Jul. 5, 2018.

(30) Foreign Application Priority Data

Jul. 6, 2017 (EP) ..................... 17180008

(51) Int. Cl.
  *G02C 13/00* (2006.01)
  *G06T 19/20* (2011.01)
(52) U.S. Cl.
  CPC ............ *G02C 13/003* (2013.01); *G06T 19/20* (2013.01); *G06T 2219/2004* (2013.01); *G06T 2219/2021* (2013.01)

(58) Field of Classification Search
  None
  See application file for complete search history.

(56) References Cited

U.S. PATENT DOCUMENTS 5,576,778 A 11/1996 Fujie et al.
6,792,401 B1 * 9/2004 Nigro .................. G02C 13/003
  703/6

(Continued)

FOREIGN PATENT DOCUMENTS

CN  1112700 A  11/1995
CN  105992966 A  10/2016

(Continued)

OTHER PUBLICATIONS

Ryan C.C. Chin, "Product Grammar: Constructing and Mapping Solution spaces", Sep. 2004, Master's Thesis, Massachusetts Institute of Technology.*

(Continued)

*Primary Examiner* — Robert Bader
(74) *Attorney, Agent, or Firm* — Thrive IP®; Georg M. Hasselmann

(57) ABSTRACT

A method for adjusting spectacles in which a virtual fitting process of a parametric frame model of a spectacle frame on a 3D model of the head of a person, to whom the spectacles are to be fitted, is divided into two fitting procedures. In a first fitting procedure, the parametric frame model is adjusted to the 3D model of the head to meet specific fitting guidelines for the parametric frame model. Fitting guidelines of this nature may be specified by a frame manufacturer to comply with aesthetic criteria in the fitting. Anatomic fitting is then performed in the second fitting procedure.

22 Claims, 12 Drawing Sheets

(56) References Cited

U.S. PATENT DOCUMENTS

| | | | |
|---|---|---|---|
| 9,286,715 | B2 | 3/2016 | Coon et al. |
| 10,441,168 | B2 | 10/2019 | Nieuwenhuis et al. |
| 2002/0015530 | A1 | 2/2002 | Henry et al. |
| 2003/0123026 | A1 | 7/2003 | Abitbol et al. |
| 2005/0162419 | A1 | 7/2005 | Kim et al. |
| 2013/0088490 | A1 | 4/2013 | Rasmussen et al. |
| 2015/0055085 | A1 | 2/2015 | Fonte et al. |
| 2015/0243015 | A1 | 8/2015 | Guerin |
| 2015/0277155 | A1 | 10/2015 | Raviv |
| 2015/0293382 | A1 | 10/2015 | Jethmalani et al. |
| 2016/0246078 | A1 | 8/2016 | Choukroun et al. |
| 2016/0299360 | A1 | 10/2016 | Fonte et al. |
| 2016/0321412 | A1 | 11/2016 | Basri |
| 2016/0327811 | A1 | 11/2016 | Haddadi et al. |
| 2016/0327815 | A1 | 11/2016 | Rego et al. |
| 2016/0360970 | A1 | 12/2016 | Tzvieli et al. |
| 2018/0017815 | A1* | 1/2018 | Chumbley ............... G02C 5/12 |
| 2020/0103675 | A1 | 4/2020 | Schwarz et al. |

FOREIGN PATENT DOCUMENTS

| | | |
|---|---|---|
| EP | 3214595 A1 | 9/2017 |
| EP | 3354190 A1 | 8/2018 |
| EP | 3355100 A1 | 8/2018 |
| EP | 3410178 A1 | 12/2018 |
| ES | 2604806 A2 | 3/2017 |
| FR | 3016050 A1 | 7/2015 |
| FR | 3016051 A1 | 7/2015 |
| FR | 3016052 A1 | 7/2015 |
| JP | 2007206211 A | 8/2007 |
| JP | 2016537716 A | 12/2016 |
| JP | 2020522076 A | 7/2020 |
| WO | 0188654 A2 | 11/2001 |
| WO | 2013177456 A1 | 11/2013 |
| WO | 2015027196 A1 | 2/2015 |
| WO | 2016135078 A1 | 9/2016 |
| WO | 2016164859 A1 | 10/2016 |
| WO | 2016176630 A1 | 11/2016 |

OTHER PUBLICATIONS

Notification of Opposition filed in EP 17180008.9, which is a counterpart hereof, dated Jun. 18, 2020.

Office action by the Japanese Patent Office issued in JP2019-572165, which is a counterpart hereof, dated Sep. 8, 2020 and English-language translation thereof.

Office action by the Chinese Patent Office issued in CN 201880057583.8, which is a counterpart hereof, dated Sep. 2, 2020, and English-language translation thereof.

"3D Shape Products," available at the url: www.3d-shape.com/produkte/face_d.php, last accessed Apr. 1, 2020.

"Asymmetrisches Kryptosystem (or Public-Key-Verschlusselungsverfahren [Public-key-encryption methods]," Wikipedia online encyclopedia entry [retrieved on Jan. 3, 2020], and English-language counterpart entry thereof, retrieved from the Internet using <URL: de.wikipedia.org/wiki/Asymmetrisches_Kryptosystem>, last edited Nov. 15, 2019.

"Attribut (Objekt) [Attribute (computing)]," Wikipedia online encyclopedia entry [retrieved on Apr. 22, 2020], and English-language counterpart entry thereof, retrieved from the Internet using <URL: de.wikipedia.org/wiki/Attribut_(Objekt)>, last edited Apr. 15, 2020.

"Bewegung (Mathematik) [Motion (Geometry)]," Wikipedia online encyclopedia entry [retrieved on Apr. 24, 2020], and English-language counterpart entry thereof, retrieved from the Internet using <URL: de.wikipedia.org/wiki/Bewegung_(Mathematik)>, last edited Oct. 31, 2018.

"Bivariate polynomial," definition in the Wikipedia article 'Polynomial,' retrieved on Jan. 3, 2020] from the url en.wikipedia.org/wiki/Polynomial#Definition, last edited Dec. 19, 2019.

Booth et al. "A 3D Morphable Model learnt from 10,000 faces," 2016 IEEE Conference on Computer Vision and Patent Recognition (CVPR), Las Vegas, NV 2016 pp. 5543-5552 doi:10.1109/CVPR.2016.598, 2016.

Brunton et al. "Review of Statistical Shape Spaces for 3D Data with Comparative Analysis for Human Faces," Computer Vision and Image Understanding, 128:1-17, 2014.

"Cyberware products," available at the url: cyberware.com/products/scanners/ps.html, 1999.

Demonstration video for "Vacker" software by VOLUMENTAL (two screenshots), available at the url: "www.volumental.com/face-scanning/," last accessed Mar. 5, 2017.

DIN EN ISO 7998:2006-01 "Ophthalmic optics—Spectacle frames—Lists of equivalent terms and vocabulary," DIN Deutsches Institut für Normung e.V., 2006.

DIN EN ISO 13666:2012 "Ophthalmic optics—Spectacle lenses—Vocabulary (ISO 13666:2012)," German and English version, Oct. 2013.

DIN EN ISO 8624:2015-12 "Ophthalmic optics—Spectacle frames—Measuring system and terminology," DIN Deutsches Institut für Normung e.V., Dec. 2015.

Eber et al. "Anatomische Brillenanpassung [Anatomic spectacles fitting]," Verlag Optische Fachveroffentlichung GmbH, 1987, pp. 24, relevance is found in paragraphs [0056], [0104], [0115], and [0181] of the instant specification.

"Generatives Fertigungsverfahren (or 3D Druck) [3D Printing]," Wikipedia online encyclopedia entry [retrieved on Jan. 3, 2020], and English-language counterpart entry thereof, retrieved from the Internet using <URL: de.wikipedia.org/wiki/3D-Druck>, last edited Dec. 11, 2019.

Hirschmüller et al.: "Stereo Processing by Semiglobal Matching and Mutual Information," in IEEE Transactions on Pattern Analysis and Machine Intelligence, vol. 30, No. 2, pp. 328-341, doi: 10.1109/TPAMI.2007.1166, Feb. 2008.

Kazemi et al. "One Millisecond Face Alignment with an Ensemble of Regression Trees," IEEE Conference on Computer Vision and Pattern Recognition, 2014.

Niessner et al. "Real-time 3D reconstruction at scale using voxel hashing," ACM Trans. Graph. 32, 6, Article 169, available at the url: doi.org/10.1145/2508363.2508374, Nov. 2013.

Niswar et al.: "Virtual Try-On of Eyeglasses using 3D-Model of the Head," Institute for Infocomm Research, DOI:10.1145/2087756.2087838, Dec. 2011.

"Optimierung (Mathematik) [Mathematical Optimization]," Wikipedia online encyclopedia entry [retrieved on Jan. 3, 2020], and English-language counterpart entry thereof, retrieved from the Internet using <URL: de.wikipedia.org/wiki/Optimierung_(Mathematik)>, last edited Aug. 16, 2019.

"Parser," Wikipedia online encyclopedia entry [retrieved on Jan. 3, 2020], and English-language counterpart entry thereof, retrieved from the Internet using <URL: de.wikipedia.org/wiki/Parser >, last edited May 20, 2019.

Rau et al. "A Semi-Automatic Image-Based Close Range 3D Modeling Pipeline Using a Multi-Camera Configuration," Sensors (Basel, Switzerland), 2012;12(8), pp. 11271 to 11293, doi:10.3390/s120811271, Aug. 14, 2012.

"Smoothing and normal estimation based on polynomial reconstruction [explaining moving least squares (MLS)]," available at the url: pointclouds.org/documentation/tutorials/resampling.php, last accessed Apr. 24, 2020.

"Spline," Wikipedia online encyclopedia entry [retrieved on Jan. 3, 2020], and English-language counterpart entry thereof, retrieved from the Internet using <URL: de.wikipedia.org/wiki/Spline >, last edited May 27, 2019.

"Syntaxbaum [Parse tree]," Wikipedia online encyclopedia entry [retrieved on Jan. 3, 2020], and English-language counterpart entry thereof, retrieved from the Internet using <URL: de.wikipedia.org/wiki/Syntaxbaum>, last edited Nov. 13, 2019.

"Verschlüsselungsverfahren [Cipher]," Wikipedia online encyclopedia entry [retrieved on Jan. 3, 2020], and English-language counterpart entry thereof, retrieved from the Internet using <URL: de.wikipedia.org/wiki/Versch1%C3%BCsselungsverfahren>, last edited Oct. 16, 2019.

"VtkModifiedBSPTree::IntersectWithLine," VTK open-source software system for image processing, 3D graphics, volume rendering and visualization, available at the url: vtk.org/doc/nightly/html/classvtkModifiedBSPTree.html#details, last accessed Apr. 24, 2020.

(56) References Cited

OTHER PUBLICATIONS

International Search Report issued in PCT/EP2018/068222, to which this application claims priority, and English-language translation thereof, dated Oct. 17, 2018.
International Preliminary Examination Report issued in PCT/EP2018/068222, to which this application claims priority, and English-language translation thereof, dated Sep. 27, 2019.
Office action by the Korean Patent Office issued in KR 10-2020-7018754, which is a counterpart hereof, dated Mar. 10, 2021, and English-language translation thereof.
Office action by the Chinese Patent Office issued in CN 201880057583.8, which is a counterpart hereof, dated May 14, 2021, and English-language translation thereof.
Pre-Appeal Examination Report by the Japanese Patent Office issued in JP 2019-572165, which is a counterpart hereof, dated Jul. 26, 2021, and English-language summary thereof.
Office action by the Japanese Patent Office issued in JP 2020-102688, which is a counterpart hereof, dated Aug. 3, 2021, and English-language translation thereof.
Office action by the Chinese Patent Office issued in CN 201880057583.8, which is a counterpart hereof, dated Aug. 12, 2021, and English-language translation thereof.
Office action by the Korean Patent Office issued in KR 10-2020-7018754, which is a counterpart hereof, dated Sep. 23, 2021, and English-language translation thereof.
Submission by the Opponent in the opposition proceeding to European patent EP 3425447, which is a counterpart hereof, dated Sep. 10, 2021.
Office action by the Japanese Patent Office issued in JP 2019-572165, which is a counterpart hereof, dated Nov. 16, 2021, and English-language machine translation thereof.

\* cited by examiner

METHOD, DEVICE, AND COMPUTER PROGRAM FOR THE VIRTUAL FITTING OF A SPECTACLE FRAME

CROSS REFERENCE TO RELATED APPLICATIONS

This application is a continuation application of U.S. patent application Ser. No. 16/734,262, filed Jan. 3, 2020, which is a continuation of international application PCT/EP2018/068222, filed Jul. 5, 2018, which claims priority to European patent application EP 17180008.9, filed Jul. 6, 2017, all of which are hereby incorporated by reference in their entireties.

TECHNICAL FIELD

The present application relates to methods, apparatuses, and computer programs for virtual fitting of spectacle frames.

BACKGROUND

Here, pursuant to DIN ESO 77998:2006-01 and DIN ESO 8624:2015-12, a spectacle frame should be understood to mean a frame or a holder by means of which spectacle lenses can be worn on the head. In particular, the term as used herein also includes rimless spectacle frames. Colloquially, spectacle frames are also referred to as frames. Within the scope of the present application, virtual donning of a spectacle frame denotes fitting a model of a spectacle frame to a model of a head on a computing device, usually connected with a graphical representation of the fitting of the spectacle frame to a head of a person on a display, for example a computer monitor.

Virtual donning of a spectacle frame on a head is known from US 2003/0123026 A1 or US 2002/0015530 A1, for example. In these documents, virtual donning of the spectacle frame predominantly serves to help a user to choose between different spectacle frames by virtue of a graphic representation of the head of the user being displayed together with the spectacle frame.

U.S. Pat. No. 9,286,715 B2, too, discloses a method for a virtual try-on of a pair of spectacles. Here, a plurality of points are defined, both on a spectacle frame and on a head. The spectacle frame is positioned on the head by virtue of selected points on the spectacle frame being brought into correspondence with selected points on the head. A position is changed by changing the selected points. This facilitates positioning with an accuracy that is sufficient for the purpose of U.S. Pat. No. 9,286,715 B2 of obtaining a virtual try-on for the purposes of providing a visual impression. Similarly, US 2005/0162419 A describes virtual donning of a spectacle frame with the aid of feature points. In this document, a frame is initially scaled and then positioned in different directions. Finally, earpieces of the spectacle frame are rotated about two spatial axes.

VOLUMENTAL has made available a demonstration video for "Vacker" software at the url "www.volumental.com/face-scanning," as of Mar. 5, 2017, in which a head with a donned pair of spectacles is presented and parameters of the pair of spectacles are modifiable by means of sliders, for example the seat of the pair of spectacles on the nasal bridge, or else other parameters such as face form angle. A color of the spectacle frame or a color of the hinge of the spectacle frame can also be selected. The selected parameters are then output. In this video, different parameters of a parametric model of a spectacle frame are also adapted.

A further system for virtually fitting a pair of spectacles is known from US 2015/0055085 A1. Here, a pair of spectacles is automatically fitted by virtue of the size and fit of the spectacles on the head of a person being adapted. Moreover, form, style, and color of the pair of spectacles can be selected.

A method and apparatus for constructing a fitted pair of spectacles, i.e., a pair of spectacles that have been fitted to the head of a person, is known from DE 102016824 A1. In this method, head image data are recorded in two or three dimensions, a pair of specimen spectacles is selected and the pair of specimen spectacles is represented on the basis of construction parameters of the pair of specimen spectacles. The construction parameters are determined on the basis of head image data.

US 2015/0277155 A1 discloses an individualization of the frame of a spectacle frame, within the scope of which distances are measured on the face of a person and the spectacle frame is created by means of 3D printing on the basis of the measured distances.

US 2013/0088490 A1 discloses an iterative method for fitting a pair of spectacles, wherein the spectacle frame is positioned by way of small steps and fitting is implemented on the basis of a collision detection, in which a check is carried out as to whether the spectacle frame overlaps with the head of the person.

US 2015/0293382 A1 discloses a determination of parameters for a virtual try-on of a pair of spectacles by means of recording a person with a donned exemplary frame. The parameters determined by means of this exemplary frame are modified accordingly for a virtual try-on of a virtual frame. Since the person already wears a spectacle frame during the recording, no three-dimensional model of the head without a spectacle frame is used in this case.

In the article "Virtual Try-On of Eyeglasses using 3D-Model of the Head," Institute for Infocomm Research, December 2011, DOI:10.1145/2087756.2087838, Niswar, Kahn, and Farbiz describe a method for virtually trying on a pair of spectacles. This is based on four reference points, with two points lying on the nose and two points lying on the ears. Here, a 3D model of the head is adapted by deforming a generic model of the head on the basis of a few feature points.

US 2016/0327811 A1 describes a computer-implemented method for fitting of a pair of spectacles. This method proceeds from a virtual model of a frame. The latter is fitted to a head by deformation. For the purposes of fitting the spectacle frame, fitting criteria can be implemented here, for example a maximization of a contact area between nose pads and the nose of the person, a maximization of a contact area of spectacle earpieces, a centration of a frame rim of the spectacle frame with respect to the eyes, an alignment of the spectacle frame or a minimization of the contact area of the frame rim with the cheekbones of the person and the eyebrows of the person.

Setting target values is specified as a possible extension to these criteria. By way of example, such target values may relate to a distance between the two spectacle earpieces of the spectacle frame, an as worn pantoscopic angle of the frame, a distance between the pads of the frame, a distance of an eye from the spectacle rim, a distance of the spectacle rim from eyebrows and cheekbone, an as-worn pantoscopic angle of the spectacle frame or a face form angle of the spectacle frame. These parameters and target values are included in a cost function and an optimization is carried out by means of a conventional optimization process, for example a Levenberg-Marquardt algorithm. Then, the frame can still be deformed.

A problem in this process is that a global optimum need not necessarily be achieved using such an optimization process since optimization methods such as the Levenberg-Marquardt algorithm can generally only find a local minimum of the cost function. In the case of waviness of surfaces in employed 3D models for spectacle frames or the head, the optimization may "get stuck" in such a surface wave far away from the optimum, and hence no optimal fitting is achieved.

Moreover, an optimization by means of such an optimization method requires a high degree of computational outlay if many parameters are used. This makes the use of parametric frame models in which a relatively large number of parameters should be optimized more difficult.

In general, the problem in the methods described in this document, and in the methods described in the other aforementioned documents as well, is that manufacturers often specify certain fitting guidelines for fitting spectacle frames, the guidelines predominantly defining esthetic criteria for the fit of the spectacles, for example a positioning of the frame rim relative to facial features such as eyes or eyebrows. Taking account of the fitting guidelines assigned to the respective spectacle frame is not easily possible in the approaches described above. On the other hand, these frame-related fitting guidelines ensure that a sought-after fit of the spectacle frame on the head is obtained for the respective spectacle frame.

Like US 2016/0327811 A1, WO 2016/164859 A1 describes a computer-implemented method for fitting "eyewear," in particular a spectacle frame, to a 3D model of the head of a person. Here, parameters of a parametric model of the spectacle frame are modified according to general criteria that apply to all spectacle frames for the purposes of an anatomical fit to a head.

SUMMARY

It is an object of the present disclosure to provide a method and an apparatus for virtual fitting of a spectacle frame to the head of a person, in which such frame-specific fitting guidelines, which fit a spectacle frame to a head in terms of aesthetic aspects, in particular, can be easily taken into account. Moreover, a corresponding computer program and a corresponding apparatus are provided.

According to a first aspect, this object is achieved with a virtual fitting method of a parametric frame model to a 3D model of the head of a person, with a first procedure satisfying fitting guidelines specific to a parametric frame model and a second procedure for anatomical fitting, and an apparatus for data processing being configured to perform the first and second procedures.

A first further object lies in facilitating the automation of such methods and apparatuses. According to a second aspect, this first further object is achieved with a method specific using fitting guidelines including target values and/or target ranges for distances between features of the spectacle frame and features of the head of the person and a corresponding apparatus.

A second further object lies in increasing the flexibility and/or accuracy of such methods and apparatuses. According to a third aspect, this second further object is achieved with a method implementing specific fitting guidelines including specifications for features derived from features of the frame and/or features of the head and a corresponding apparatus.

A third further object lies in facilitating a use of such methods and apparatuses for spectacle frames from different manufacturers. According to a fourth aspect, this third further object is achieved with a method implementing a conversion of the fitting guidelines and/or the parametric frame model into a predetermined format a corresponding apparatus.

A fourth further object lies in increasing the efficient implementation of such methods and apparatuses. According to a fifth aspect, this fourth further object is achieved with a method implementing first fitting procedure utilizing a syntax tree and a corresponding apparatus.

A fifth further object lies in increasing the accuracy of such methods and apparatuses. According to a sixth aspect, this fifth further object is achieved with a method wherein the first fitting procedure takes the weight of spectacle lenses into account and a corresponding apparatus.

A sixth further object lies in increasing the security of such methods and apparatuses. According to a seventh aspect, this sixth further object is achieved with a method wherein the parametric frame model and/or the specific fitting guidelines are present in encrypted form and a corresponding apparatus.

Exemplary embodiments of apparatuses, computer programs, and computer-readable storage media are discussed in detail below.

According to the disclosure, a computer-implemented method for virtual fitting of spectacles is provided according to various aspects, the method comprising virtual fitting of a parametric frame model of a spectacle frame to a 3D model of the head of a person. The method is characterized in that the virtual fitting comprises the following procedures:

a first fitting procedure for fitting the parametric frame model to the 3D model of the head, so as to satisfy fitting guidelines that are specific to the parametric frame model, and a second fitting procedure for fitting the parametric frame model to the 3D model of the head for anatomical fitting.

By virtue of dividing the fitting into the first fitting procedure and the second fitting procedure, it is easily possible to take account of specific fitting guidelines, which, as explained above, may be predetermined by frame manufacturers, in generic fashion within the scope of the first fitting procedure. Then, remaining anatomical fitting to the form of the head can be undertaken in the second fitting procedure.

Below, the terms used in the aforementioned method and the method described below will be explained.

The fitting is "virtual" because the process is carried out on a computing device such as a personal computer (PC) and the real spectacle frame is not placed on the real head.

A model, in particular a 3D model, should be understood to mean a three-dimensional representation of real objects, which are available as a data record in a storage medium, for example a memory of a computer or a data medium. By way of example, such a three-dimensional representation can be a 3D mesh, consisting of a set of 3D points, which are also referred to as vertices, and connections between the points, which connections are also referred to as edges. In the simplest case, these connections form a triangle mesh. Such a representation as a 3D mesh only describes the surface of an object and not the volume. The mesh need not necessarily be closed. Thus, if the head, for example, is described in the form of a mesh, it appears like a mask. Details in respect of such 3D models are found in Rau J-Y, Yeh P-C, "A Semi-Automatic Image-Based Close Range 3D Modeling Pipeline Using a Multi-Camera Configuration," Sensors (Basel, Switzerland). 2012; 12(8):11271-11293. doi:10.3390/s120811271; in particular page 11289, FIG. 16.)

A voxel grid, which represents a volume-type representation, is a further option for representing a 3D model. Here, the space is divided into small cubes or cuboids, which are referred to as voxels. In the simplest case, the presence or absence of the object to be represented is stored in the form of a binary value (1 or 0) for each voxel. In the case of an edge length of the voxels of 1 mm and a volume of 300 mm×300 mm×300 mm, which represents a typical volume for a head, a total of 27 million such voxels is consequently obtained. Such voxel grids are described in, e.g., M. Nießner, M. Zollhöfer, S. Izadi, and M. Stamminger, "Real-time 3D reconstruction at scale using voxel hashing," ACM Trans. Graph. 32, 6, Article 169 (November 2013), url: doi.org/10.1145/2508363.2508374.

In particular, the 3D model of the head and/or the 3D model of the spectacle frame can be a 3D model with texture. A 3D model with texture is understood to mean a 3D model which additionally contains the color information of the surface points of the real object. The use of a 3D model with texture facilitates a true-color representation of the head and the spectacle frame.

Here, the color information can be contained directly in the vertices as an attribute, for example as an RGB (red green blue) color value, or a pair of texture coordinates is attached to each vertex as an attribute. Then, these coordinates should be understood to be image coordinates (pixel positions) in an additional texture image. Then, the texture of the aforementioned triangles of the triangle mesh, for example, is generated by interpolation from the pixels of the texture image.

Here, an attribute generally denotes a feature, characteristic or the like, which is assigned to an object, a specific vertex in the present case (see also the German Wikipedia article "Attribut (Objekt) [Attribute (computing)]," as of Jul. 5, 2017).

A parametric model is a 3D model having one or more variable parameters. Then, the geometry of the object described by the 3D model, in this case the spectacle frame, changes, e.g., in respect of size or form, by changing the parameter or parameters. Examples of such parameters include, for example, a bridge width or an earpiece length of the spectacle frame, or else a form of a frame rim of the spectacle frame. The type and number of these parameters depend on the spectacle frame represented by the parametric frame model. In particular, a manufacturer of the spectacle frame can set value ranges for the parameters, which then accordingly describe spectacle frames that are able to be manufactured. A free frame parameter is understood to mean a parameter of the parametric frame model, which parameter has not yet been set within the scope of the method, i.e., which parameter still needs to be fitted and determined.

Fitting guidelines are specifications relating to how the spectacle frame should be positioned relative to regions or points on the head, such as eyes, pupils, eyebrows or nose. These fitting guidelines that are specific to the parametric frame model are used, in particular, to ensure an esthetic impression that is desired by the manufacturer of the spectacle frame. The frame-specific fitting guidelines can be provided together with the parametric frame model in electronic form, for example as appropriate files, by a respective manufacturer. Here, "frame-specific" means that the fitting guidelines are available separately for each spectacle frame model and the fitting guidelines provide specific prescriptions for this spectacle frame model.

By contrast, the anatomical fitting relates to fitting that is intended to ensure a correct comfortable fit of the spectacle frame on the head. In this respect, use is made of criteria that are not specific to the respective spectacle frame but that apply in general to a multiplicity of different spectacle frames. These criteria can be predetermined by a manufacturer of an apparatus used to carry out the above-described method. They may also be predeterminable and/or adjustable by a person carrying out the method, for example an optician or else a physician. Such criteria may also be predetermined by a frame manufacturer or else by a plurality of frame manufacturers together, with the criteria in this case, too, not relating specifically to one frame but being applicable to various types of frames. Examples of such criteria relate to correct fit of the spectacle frame on the ears or a correct fit of the nose pads of the pair of spectacles. The anatomical fitting can also comprise ensuring minimum distances to regions of the head, e.g., ensuring a minimum distance between the frame rims of the spectacle frame and the cheekbones and/or an eyebrow section of the head and/or ensuring a minimum distance to the eyelashes. A further example of anatomical fitting lies in the setting of an intended distance or an intended range for the distance between the spectacle lens and the eye, i.e., the vertex distance (German abbreviation HSA). The vertex distance is the distance between the front surface of the cornea of the eye and the surface of the spectacle lens facing the eye. By way of example, anatomical fitting can ensure that an intended vertex distance of 12 mm or a vertex distance ranging from 12 mm to 17 mm is observed. The reason for this is that the spectacle lens should not be placed too close to the eye in order to avoid contact with the eyelashes and to avoid condensation on the lens (sweating). Moreover, some opticians like to avoid the deviation of the vertex distance from a vertex distance that is preset in a phoropter used to measure the spherocylindrical refraction. Since a relatively large vertex distance modifies the optical power in the direction of positive diopter values, a relatively large vertex distance may possibly be typical in the case of farsightedness, i.e., when so-called plus lenses are required. Therefore, an intended vertex distance based on the result of the refraction measurement can be used in advantageous fashion.

The fitting guidelines are typically available in this case text form, for example as an xml or JSON file, which simplifies processing.

The fitting guidelines may be encrypted, for example by means of asymmetric cryptography (see the German Wikipedia article "Asymmetrisches Kryptosystem (or Public-Key-Verschlüsselungsverfahren [Public-key-encryption methods]", as of Jun. 8, 2017), and thus be protected against unauthorized modification by signing and unauthorized persons can be prevented from having read access by way of encryption. Here, a frame manufacturer can encrypt the frame-specific fitting guidelines by means of a public key of the system manufacturer and additionally sign it with the aid of its own key and consequently a frame manufacturer can make the origin and integrity of the fitting guideline visible to the system manufacturer. On the other hand, the frame-specific guidelines of a first manufacturer are not visible to a second frame manufacturer.

Within the scope of the present application, a "person" denotes that person to whose head the spectacle frame should ultimately be fitted. A "user" denotes a person operating and carrying out the apparatus and the method for fitting spectacles. This may be the person themselves but also someone else, for example an optician.

Typically, the method further comprises a conversion of the parametric frame model and/or the fitting guidelines into a predetermined format. The parametric frame rim model, in particular, can be provided in various formats by a spectacle frame manufacturer, for example in proprietary formats of a respectively employed CAD (computer aided design) program. As a result of the conversion, subsequent processing, in particular the first and second fitting procedure, can be carried out uniformly for frame models or fitting guidelines from various manufacturers, which were originally available in different formats.

In one typical exemplary embodiment, the parametric frame model comprises a plurality of parameters. Then, a first set of parameters is determined in the first fitting procedure and a remaining second set of parameters is determined in the second fitting procedure. As a result, fewer remaining free parameters need be determined in the second fitting procedure of anatomical fitting, in particular, simplifying the detection of an optimum when conventional optimization algorithms are used.

Such parameters may include, in particular, a width of the spectacle frame, a bridge width of the spectacle frame, the pantoscopic angle of the spectacle frame (see DIN EN ISO 8624:2015-12, page 12, A.14) of the spectacle frame, an earpiece length of the spectacle earpieces of the spectacle frame, a position of nose pads of the spectacle frame, optionally separately for left and right nose pads, vertical and/or horizontal work angles of the nose pads, optionally separately for left and right nose pads (with the term nose pads in the case of models without offset nose pads denotes the nose support, i.e., the contact area with the nose), a radius of a base curve of the frame and/or a face form angle. The base curve is defined for spectacle lenses in DIN EN ISO 13666:2013-10; in this respect, see DIN EN ISO 13666:2013-10, page 58, 11.4. It is not explicitly stated in the standard for spectacle frames; however, in this respect, see FIG. 4 in DIN EN ISO 8624:2015-12 on page 7, and page 9, A.13. The base curve specifies the radius of the bend of the frame in a plan view from above. These parameters are partly defined in the standards defined above. Spectacle frames are well definable by way of these parameters.

In the first fitting procedure, it is possible to set, in particular, the width of the frame in accordance with an overall scaling, the inclination and/or a form of the frame rim, should these be kept variable by the manufacturer, for the purposes of meeting the fitting guidelines. In particular, these parameters are also relevant to the esthetic effect of the spectacle frame worn on the head, and so an esthetic impression desired by the spectacle manufacturer can be obtained. Others of the aforementioned parameters, for example the bridge width and earpiece length, can then be set in the second fitting procedure.

The specific fitting guidelines may specify, in particular, target values or target ranges (target value, minimum value, maximum value) for distances between features of the spectacle frame and features on the head. Here, features of the frame may contain physical features of the frame, such as, e.g., the frame rim or parts thereof (upper frame rim, lower frame rim), or else virtual features, for example a box center of a box corresponding to the box system defined in DIN ISO 13666, wherein the box represents a rectangle in a lens plane that surrounds the frame rim. The center or other features of this box are likewise features of the spectacle frame within the aforementioned sense.

Accordingly, the features of the head may also be physical features, such as, for example the position, orientation and dimension of the nose, the position, orientation and dimension of the eyebrows, the position of the chin, the pupil center position and dimension of the eyes or else position dimensions of the eyes. However, auxiliary features may also be derived from these physical features, for example by linking a plurality of these features by calculations.

Then, the first fitting procedure can easily be carried out in automated fashion by using such features.

The first fitting procedure can be undertaken with the aid of a syntax tree, as is described, e.g., in the German Wikipedia article "Syntaxbaum [Parse tree]," as of May 18, 2017. This allows efficient fitting. A syntax tree or parse tree is understood to mean, in abstract general fashion, a tree-shaped representation of a derivation, i.e., a procedure, of how words (within the meaning of computer science, as explained in the aforementioned Wikipedia article) are generated by means of formal grammar. In the specific case of the first fitting procedure, these rules provide auxiliary features, target values or target ranges (and calculation prescriptions therefore) for features or auxiliary features, a fit quality which specifies to what extent the specific fitting guidelines are met (e.g., as a weighted square sum of the deviation from target values or the target regions) or calculation formulae for frame parameters that should be adapted in the first fitting procedure.

Here, within the scope of the first fitting procedure, a deviation from the target values or target ranges can be used as a penalty term in the fitting procedure, which penalty term should be kept as small as possible in correspondence with the use in conventional optimization methods. Thus, the penalty term denotes a term that characterizes a deviation from the target values or target ranges and that should be kept as small as possible by an optimization method, which then corresponds to a small deviation from target values or target ranges.

Otherwise, the deviation from the target values within the target ranges can be taken into account as a square deviation.

Such uses of penalty terms and optimization methods are described in the German Wikipedia article "Optimierung (Mathematik) [Mathematical Optimization]," and in the chapter "Methoden der lokalen nichtlinearen Optimierung mit Nebenbedingungen [Methods of local nonlinear optimization with constraints]" therein, as of May 18, 2017.

The parametric frame model and/or the fitting guidelines specific to the parametric frame model may also be available in encrypted form in order to not make such manufacturer-specific data accessible to third parties. To this end, use can be made of conventional encryption techniques, for example by means of public and private keys. Information in this respect can also be found, for example, in the German Wikipedia article "Verschlüsselungsverfahren [Cypher]", as of May 18, 2017.

In particular, the first fitting procedure can be implemented as an optimization loop on the basis of the features and of the syntax tree. Such an optimization loop may comprise virtual donning of the spectacle frame, a term evaluation on the syntax trees of the target values and, optionally, a target function, which is calculated by means of the aforementioned square deviation and, optionally, the penalty term. Using such an optimization loop, it is possible to implement a general fitting procedure for virtually any description of the fitting guidelines. In other words, a multiplicity of different fitting guidelines can be covered by such an approach.

In particular, a weight of spectacle lenses can be taken into account here within the scope of the virtual donning. By way of example, the weight of the spectacle lenses may influence the pair of spectacles or nose pads sinking into the skin or the pair of spectacles slipping down the nasal bridge; see J. Eber, "Anatomische Brillenanpassung [Anatomic spectacles fitting]," Verlag Optische Fachveröffentlichung GmbH, 1987, page 24 ff. By taking account of the weight of the spectacle lenses, it is possible to take account of such an effect in order to meet the fitting guidelines even in the case of such sinking-in or slipping.

The second fitting procedure can be carried out in a manner known per se, for example as described in the prior art explained at the outset in relation to document US 2013/0088490 A1 or US 2015/0293382 A1. In particular, it is possible to calculate collision regions in this case, as described in US 2016/0327811 A1 discussed at the outset. Use can also be made of methods as described in the European patent application EP 3410178 A1.

Further, the method may comprise a calculation of a quality measure for the virtual fitting, i.e., for the result of the first and/or second fitting procedure. Here, the quality measure specifies how well the specific fitting guidelines and/or requirements for the anatomical fitting were satisfied. By way of example, it can be calculated on the basis of distance values of the fitted spectacle frame from regions of the head of the person, with weighting where appropriate. The quality measure can provide the person and/or the user with feedback as to the quality of the fitting of the spectacle frame. By way of example, a comparison of the quality measure with a threshold value allows a recognition that the fitting was not good enough to ensure a comfortable fit of the spectacle frame.

The above-described method can be carried out by means of an apparatus for virtual fitting of a pair of spectacles, the apparatus comprising one or more processors and a display, wherein a corresponding computer program with a program code for carrying out the method runs on the processor or processors. The computer program may be stored on a memory of the apparatus or may else be provided via a cloud. Here, it should be noted that the apparatus may also be implemented by means of a distributed system, which has various spatially separated components. By way of example, a portion of the fitting procedures and calculations to this end can be carried out on a comparatively powerful computer, for example an external server, while the interaction with a user is carried out on a local computer.

Provision is also made of a computer program comprising instructions that, upon execution of the program by a computer, cause the latter to carry out one of the methods as described above.

Provision is also made of an, in particular tangible, computer-readable storage medium comprising instructions that, upon execution by a computer, cause the latter to carry out one of the methods as described above. Examples of storage media comprise optical storage media such as CDs or DVDs, magnetic storage media such as hard disk drives or solid-state storage such as flash memories or read-only memories (ROMs).

Provision is also made of an, in particular tangible, computer-readable data medium, which stores the computer program as described above.

Moreover, provision is made of a data medium signal (e.g., via a network such as the Internet), which transmits the computer program as described above.

Provision is also made of an apparatus for data processing and/or for fitting of a pair of spectacles, comprising means for carrying out the method as described above.

Moreover, a method is provided for producing a spectacle frame, comprising:
  carrying out the method as described above,
  virtual fitting of a spectacle frame to the 3D model of the head using the first measurement points, and
  producing the fitted spectacle frame.

The 3D model comprising the first measurement points and provided with the method as described above is therefore initially used for virtual fitting of a spectacle frame. Virtual fitting of the spectacle frame per se can be implemented as described in the prior art explained at the outset. Then, the spectacle frame virtually fitted in this way can be provided as a physical spectacle frame, as likewise explained in the prior art cited at the outset. Manufacturing can be implemented by means of an additive method such as 3D printing, for example; for an overview in this respect, see the German Wikipedia article "Generatives Fertigungsverfahren (or 3D Druck) [3D Printing]" as of Jun. 25, 2018.

BRIEF DESCRIPTION OF THE DRAWINGS

The disclosure will now be described with reference to the drawings wherein.

DESCRIPTION OF EXEMPLARY EMBODIMENTS

Figure 1:
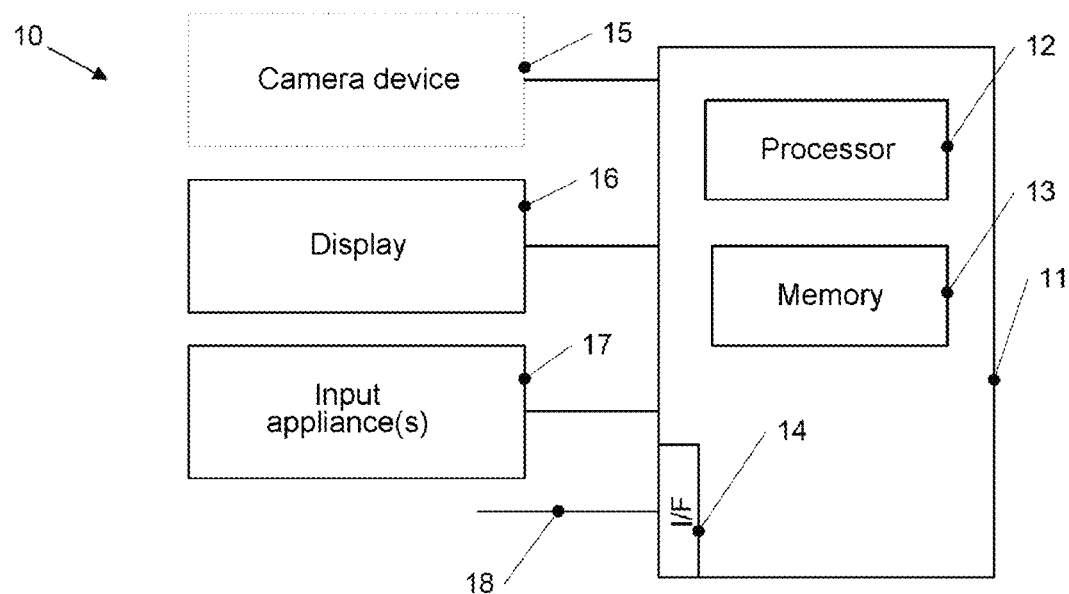
FIG. 1 shows an apparatus for virtual fitting of a pair of spectacles according to one exemplary embodiment.

FIG. 1 shows an exemplary embodiment of an apparatus for virtual fitting of a pair of spectacles according to one exemplary embodiment. The apparatus of FIG. 1 comprises a computing device 11, which comprises a processor 12 and a memory 13. The memory 13 serves to store data and, in the exemplary embodiment of FIG. 1, comprises a random access memory (RAM), a read-only memory (ROM) and one or more mass storage media (hard disk, solid-state disk, optical drive, etc.). A program is stored in the memory 13, the program, when executed on the processor 12, being used to carry out a method for virtual fitting of a pair of spectacles, as already described above or as yet to be explained in more detail below.

The apparatus of FIG. 1 further comprises a display 16 which displays a head of a person together with a spectacle frame when the computer program is executed on the processor 12. User inputs can be implemented by way of one or more input appliances 17, for example keyboard and mouse. Additionally or alternatively, the display 16 can be a touch-sensitive screen (touchscreen) in order to be able to implement inputs.

The apparatus of FIG. 1 furthermore comprises an interface 14 to a network 18, by means of which data can be received. In particular, it is possible to receive here parametric frame models of spectacle frames and associated fitting guidelines from manufacturers of spectacles. In some exemplary embodiments, data are also transmitted to a further computing device via the interface 14 in order there to carry out, e.g., a portion of the calculation required for fitting this pair of spectacles. In order to create a 3D model of a head of a person, to which the pair of spectacles should be fitted, the apparatus of FIG. 1 optionally comprises a camera device 15, by means of which a plurality of images of the person can be recorded from different directions and the 3D model can be determined. Information in respect of such a determination of 3D models on the basis of image recordings is found in, e.g., H. Hirschmüller, "Stereo Processing by Semiglobal Matching and Mutual Information" in IEEE Transactions on Pattern Analysis and Machine Intelligence, vol. 30, no. 2, pp. 328-341, February 2008.doi: 10.1109/TPAMI.2007.1166.

Figure 2:
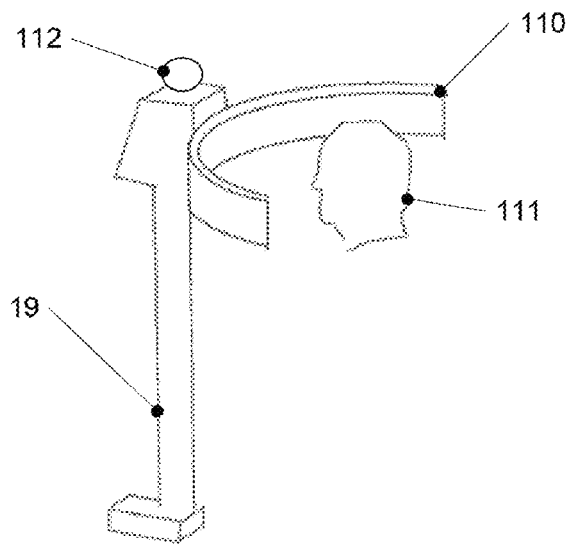
FIG. 2 shows an example of an implementation of a camera device of FIG. 1.

FIG. 2 shows an exemplary embodiment for the camera device 15 of FIG. 1. In the exemplary embodiment of FIG. 2, a semicircular arrangement 110 of cameras is fastened to a column 19. A person can then position themselves in such a way that a head 111 of the person, as shown in FIG. 2, is positioned in the semicircular arrangement 110 and can be recorded from different directions. Then, a 3D model of the head 111 can be created therefrom. A texture, i.e., information in respect of colors (as explained above) of the model, also emerges from the image recordings. Moreover, such an apparatus can be used for centration measurements, as described in the European patent application EP 3355100 A1.

Figure 3:
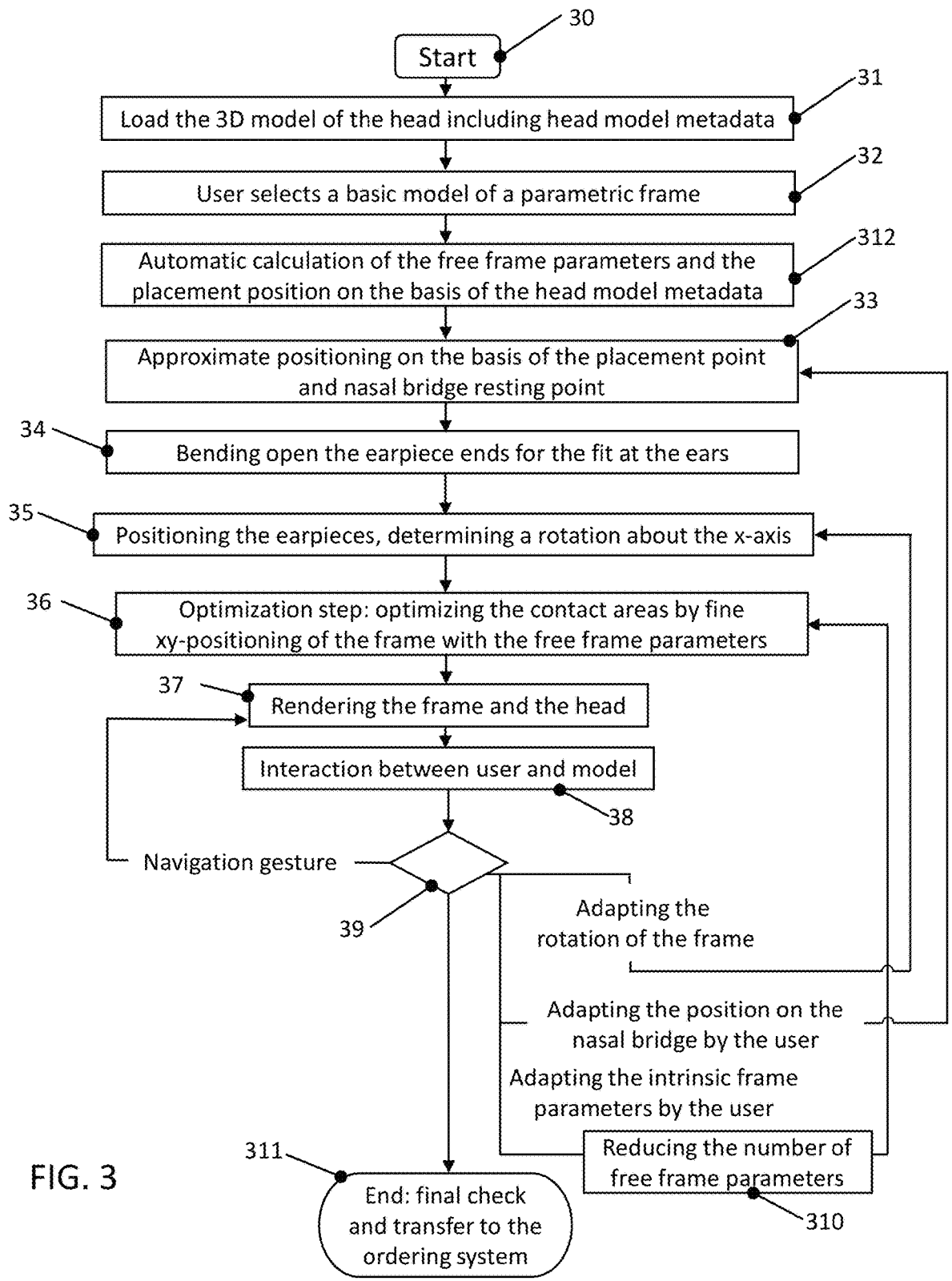
FIG. 3 shows a flowchart that provides an overview of a method for fitting a pair of spectacles according to one exemplary embodiment.

FIG. 3 shows a flowchart of an overall method for virtual fitting of a pair of spectacles according to one exemplary embodiment. The present application relates, in particular, to partial steps of this method.

The method begins in step 30. In step 31, a 3D model of the head, including head model metadata, is loaded from a memory. The 3D model can be created with the aid of image recordings, as explained above with reference to FIGS. 1 and 2, or it may be an already available 3D model, for example from earlier fitting of a pair of spectacles to a certain person.

The head model metadata are data that contain information items about the features of the 3D model but not the model itself. In particular, the metadata may supply additional information in respect of the 3D model of the head and/or contain certain points, curves or regions on the 3D model of the head. More details about the use of such metadata is also found in the European patent application EP 3410178 A1.

A basic model of a spectacle frame described by a parametric frame model is selected in step 32. The parametric frame model has free parameters, i.e., parameters to be determined. Examples of such free parameters were already specified further above in the context of the description of the parametric frame model, specifically the bridge width or earpiece length of the spectacle frame, or else a form of a frame rim of the spectacle frame.

In step 312, at least some of the parameters are then calculated on the basis of a fitting guideline associated with the frame model, as described above and explained in more detail below. Other parameters are determined on the basis of anatomical fitting, as likewise already explained.

Then, there is virtual donning of the spectacles with more in-depth anatomical fitting in steps 33 to 310. To this end, in step 33 there is approximate positioning on the basis of a placement point and a nasal bridge resting point, as already described in the European patent application EP 3410178 A1. The spectacle earpieces are bent open to the ears of the head and the earpieces are positioned, wherein there may be a rotation about an x-axis of the pair of spectacles, in steps 34 and 35. Here, the x-axis corresponds to a direction that connects the eyes in the head, the z-direction corresponds substantially to the direction of the earpieces and the y-direction is perpendicular thereto. Contact areas of the pair of spectacles are optimized in step 36 by means of fine positioning in the xy-plane. Moreover, parameters not yet set in step 312 can be adapted further here. Steps 34-36 in this case correspond to the corresponding steps described in the European patent application EP 3410178 A1. Within the scope of this fitting, the parametric spectacle model can be deformed and positioned, in particular, after the parameters were determined in step 312.

The frame and the head are then rendered in step 37, i.e., there is an appropriate representation on the display 16 of FIG. 1. This rendering, too, is already described in the European patent application EP 3410178 A1. Here, rendering, also referred to as image synthesis, is understood to be the creation of an image (e.g., for display on a computer monitor) on the basis of raw data, from the respective models in this case.

Then, there is an interaction of the user with the model in step 38 which, as illustrated in step 39, may have various consequences. Thus, there may simply be navigation, for example in order to observe the head from a different direction. In this case, there is new rendering in step 37.

The interaction in step 39 also allows manual adaptation of the rotation of the frame about the x-axis. In this case, the method returns to step 35, for example to determine the earpieces in accordance with the new position of the frame.

Moreover, the interaction of the user with the model may also adapt the position of the spectacle frame on the nasal bridge of the head model by way of a user of the apparatus. This substantially changes the position of the spectacle frame set in step 33. Therefore, the method returns to step 33 in this case.

The previously described types of interaction, in particular navigation, for example for changing the observation angle, adapting the rotation and adapting the position of the pair of spectacles disposed on the nasal bridge, have likewise already been explained in detail in the European patent application EP 3410178 A1.

Moreover, one of the frame parameters of the parametric frame model can also be set by the user within the scope of the interaction. By way of example, the user can in this case modify the determination of parameters implemented by the automatic calculation in step 312. In this case, this reduces the number of free frame parameters in step 310 and the method is continued in step 36. If the user is finally satisfied with the fit following the interaction, the method is terminated in step 311. In the process, there can still be a final check. The user (e.g., an optician) checks the order data during the final check. In the process, the data of the order and corresponding pictorial representations are presented to the user on an overview monitor. The representations show the parameters of the spectacle frame and/or of the head determined within the scope of the method, such as a bridge width and the nasal wing angle, etc., and also the parameters of the ordered frame, possibly also with notes about deviations from an ideal form which, e.g., are prescribed by the fitting guidelines. The determination of such parameters will still be explained below. Then, the ascertained parameters can be transmitted to an ordering system of the respective manufacturer in order to order a physical spectacle frame with the corresponding parameters.

Individual aspects of the method of FIG. 3 will now be explained in greater detail below with reference to FIGS. 4 to 15.

Figure 4:
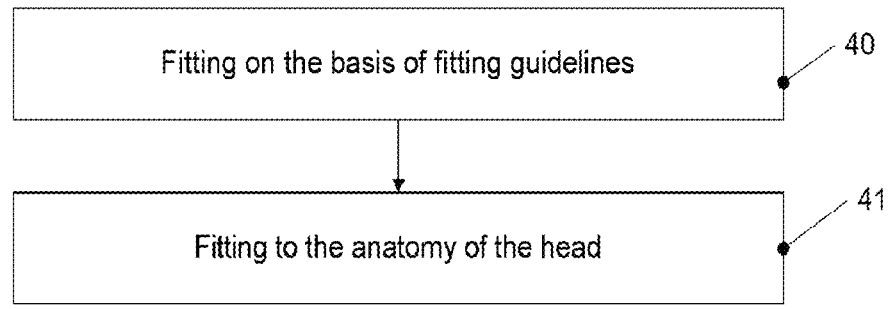
FIG. 4 shows a flowchart of a method according to one exemplary embodiment, which is usable in the method of FIG. 3.

FIG. 4 shows a flowchart of a method according to one exemplary embodiment. FIG. 4 shows a subdivision of the spectacle fitting into fitting on the basis of fitting guidelines associated with a respective parametric frame model, followed by fitting to an anatomy of the head.

In the method of FIG. 4, the parametric frame model is fitted to a 3D model of the head of the person on the basis of fitting guidelines in step 40, the fitting guidelines being predetermined by the spectacle frame manufacturer of the respective spectacle frame, specifically for the spectacle frame. These fitting guidelines may relate to esthetic prescriptions, as likewise explained in more detail below. Implementation examples for this step will be explained in even greater detail later. By way of example, step 40 can be carried out within the scope of step 312 of FIG. 3.

A first set of parameters of the parametric frame model can be set by the adaptation in step 40.

Then, general fitting to the anatomy of the head of the person is undertaken in step 41, i.e., the fitting in step 41 is implemented independently of the specific fitting guidelines. This fitting can be implemented as described in the prior art cited at the outset, and can likewise be implemented in step 312 or optionally also in the adaptation in steps 34 and 35. Then, the anatomical spectacle fitting can also take place directly on the basis of the metadata of the head model, or else as explained in Johannes Eber, "Anatomische Brillenanpassung", Verlag Optische Fachveröffentlichung GmbH, 1987, page 23ff.

Figure 5:
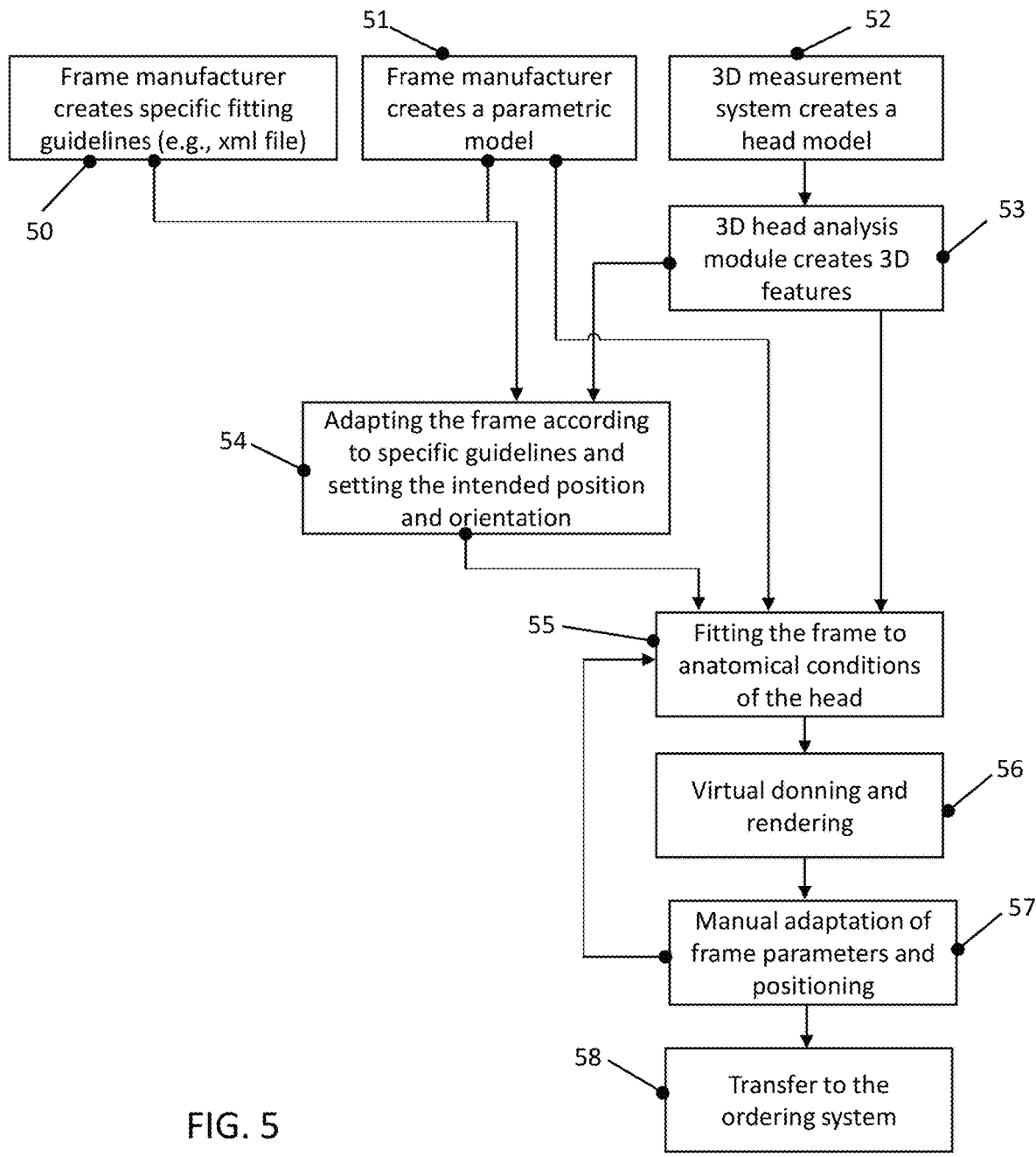
FIG. 5 shows a flowchart of a method according to one exemplary embodiment, which is usable within the scope of the method of FIG. 3.

FIG. 5 shows a detailed flowchart of an implementation of the method of FIG. 4.

Input data for the method are provided in steps 50 to 53 in FIG. 5. In step 51, a frame manufacturer creates a parametric frame model for a spectacle frame. The parametric frame model of step 51 can in this case be transferred into a uniform, standardized format, which is used in the method according to the disclosure if the data are supplied by the spectacle manufacturer in a proprietary CAD (computer aided design) format.

Moreover, there can be a data reduction (e.g., a reduction in the number of triangles or voxels in the 3D model) or a data compression with the aid of conventional compression methods.

In step 50, the frame manufacturer creates specific fitting guidelines for this parametric frame model, which, as explained, can take account of esthetic aspects when fitting the frame.

A 3D model of the head of the person is created and analyzed in steps 52 and 53. Here, the model is initially created in step 52 with a 3D measurement system, in particular with the camera device shown in FIG. 2. Other types of measurement systems, such as 3D head scanners, can also be used. Examples of such head scanners are found at the url cyberware.com/products/scanners/ps.html or www.3d-shape.com/produkte/face_d.php, in each case as of Jun. 8, 2017. In step 53, points or regions are then identified as features on this head model, for example points and features as are also used in the prior art explained at the outset.

Then, the frame is fitted in step 54 in accordance with the specific fitting guidelines, corresponding to step 40 in FIG. 4. Additionally, an intended position and orientation of the spectacle frame can be set as a start value for the adaptation in step 54. A position by means of metadata such as in the European patent application EP 3410178 A1 with predetermined standard parameters for the parametric frame model can serve as intended position and intended orientation, which may serve as a start value for the adaptation. As an alternative thereto, the intended position can be calculated from the specific fitting guidelines in some cases. By way of example, the specific fitting guidelines define the typical position of the frame rim with respect to the pupil centers in the xz-plane, the intended vertex distance (e.g., 12 mm) defines the position in the direction of the y-axis. The as worn pantoscopic angle can also be set as part of the orientation of the frame in space, i.e., the angle about the x-axis, to an intended value of 9 degrees, for example. This may likewise be part of the specific fitting guidelines.

Then, the frame is fitted to anatomical conditions of the head in step 55. Here, parameters that were not yet fitted in step 54, i.e., which are still free parameters, are adapted further.

In step 56 there is virtual donning and rendering, and a manual adaptation in step 57. Here, the virtual donning and manual adapting is implemented as already described with reference to reference signs 33 to 310 in FIG. 3.

In step 58, there is a transfer to an ordering system of the frame manufacturer, corresponding to step 311 in FIG. 3.

The use of frame-specific fitting guidelines and the corresponding adaptation are now explained in more detail with reference to FIGS. 6 to 10.

Figure 6:
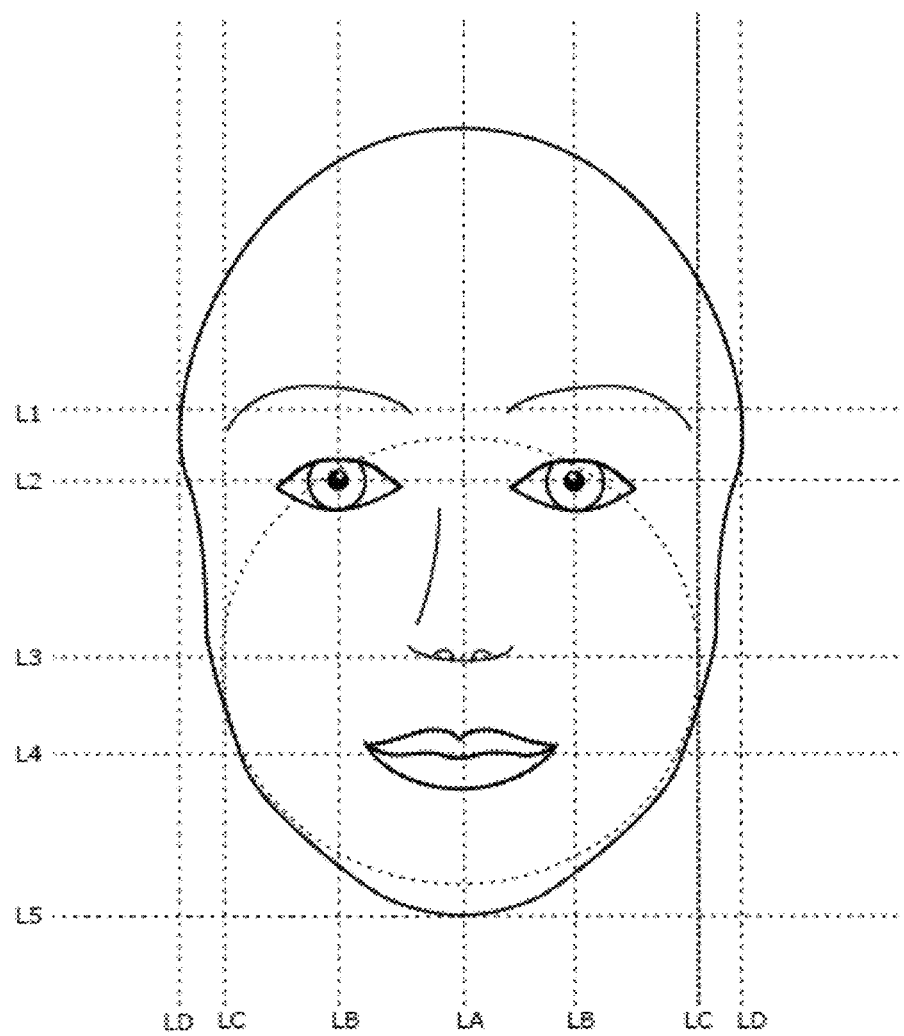
FIG. 6 shows a view for elucidating features of a head that may be referred to in fitting guidelines.

FIG. 6 shows various features of the face, which are suitable as features and points in the face for such specific fitting guidelines. In other words, a target position or target range of features of the spectacle frame relative to such points of the face is provided in the fitting guidelines in such an exemplary embodiment. Such features of the face are also explained in Johannes Eber, "Anatomische Brillenanpassung", Verlag Optische Fachveröffentlichung GmbH, 1987, page 17ff.

Examples include:
1. The position of the eyes, in particular the pupil centers (point of intersection of the line L2 with the lines LB in FIG. 6). Line L2 moreover denotes the pupil axis.

2. The box dimensions of the eyes, i.e., the dimensions of a rectangle placed around the eyes—position of each rectangle, width and height of the rectangles.
3. The position of the nose in accordance with lines LA and L3 in FIG. 6.
4. The width of the face and the position of the temples corresponding to the lines LD in FIG. 6.
5. The height of the face between the lines L1 and L5 in FIG. 6, and the line of the chin (line L5) in FIG. 6.
6. The radius of curvature of the chin region, i.e., of the part of the chin touching the line L5.
7. The position of the eyebrows, wherein the line L1 in FIG. 6 represents the central axis of the eyebrows and the lines LC represent a respective outer limit of the eyebrows.
8. The position of the mouth in accordance with line L4 in FIG. 6.

The aforementioned features can be identified by a procedure as described below by means of a parametric head model or else by image analysis methods (image recognition) and/or by machine learning in images recorded by the camera device of FIG. 2, and the position of the features can thus be determined on the 3D model of the head. An option for automatic recognition of such features is also described in V. Kazemi, J. Sullivan, "One millisecond face alignment with an ensemble of regression trees," Proceedings of the IEEE Conference on Computer Vision and Pattern Recognition, 2014.

In the following description, references such as left eye, right eye, left half of the face or right half of the face should be understood from the view of the person for whom the pair of spectacles is fitted.

Figure 7:
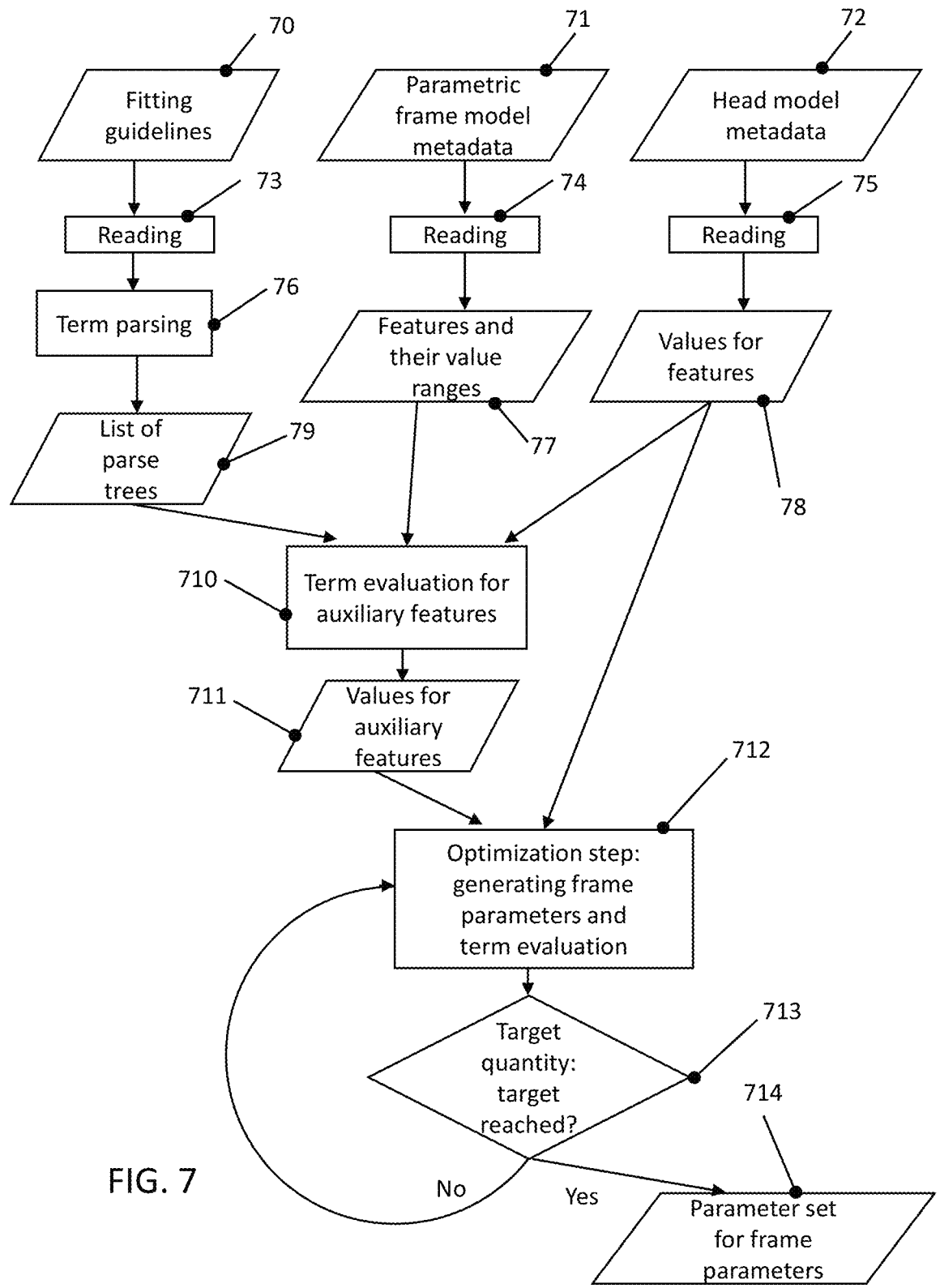
FIG. 7 shows a detailed implementation of method step 40 in FIG. 4 or of step 54 in FIG. 5.

FIG. 7 shows a detailed method for fitting the spectacle frame on the basis of the fitting guidelines, i.e., a detailed example for step 40 in FIG. 4 or step 54 in FIG. 5, together with the provision of the data.

Fitting guidelines for a parametric frame model are provided at step 70 in FIG. 7, the fitting guidelines being read into a computing device in step 73 in order to be able to use these in the presented method. Here, the fitting guidelines are stored as a text file, for example, such as an xml file or JSON file.

A parametric frame model is provided in step 71, the fitting guidelines at step 70 being assigned thereto. Metadata that denote certain regions or points of the frame model, for example, may be assigned to the parametric frame model. Such metadata of a frame model are also described in the European patent application EP 3410178 A1. This parametric frame model is read in step 74. In step 77, the parameters of the parametric frame model arising from being read at step 74 and their value ranges are provided for subsequent optimization. Finally, a 3D model of the head of the person, for whom a spectacle frame should be fitted, is provided with the associated metadata at step 72, the model being read in step 75.

The fitting guidelines are parsed in step 76. Parsing is understood to mean a decomposition and conversion of input data into a format more suitable for further processing. A parser is a corresponding device (usually implemented by a computer program), which carries out such parsing. More details in this respect are found in the German Wikipedia article "Parser [Parsing]," as of May 19, 2017.

Here, the fitting guidelines are translated, in particular, into a format that is suitable for the subsequent optimization process. Here, as explained, the fitting guidelines may contain target quantities and/or admissible ranges, in particular for distances between features of the spectacle frame and features on the head, for example a distance between the upper frame rim and the eyebrows, a distance between the upper frame rim of the frame and an upper edge of the eyes, a distance of the lower frame rim to a lower edge of the eyes or a relative position of the pupil with respect to the frame rims. Moreover, it is also possible to use distances to calculated derived features, i.e., points or regions that are derived from a plurality of features of the head and/or of the frame. Such derived features are also referred to as auxiliary features. The use of such derived features allows greater flexibility and/or accuracy of the adaptation.

Figure 8:
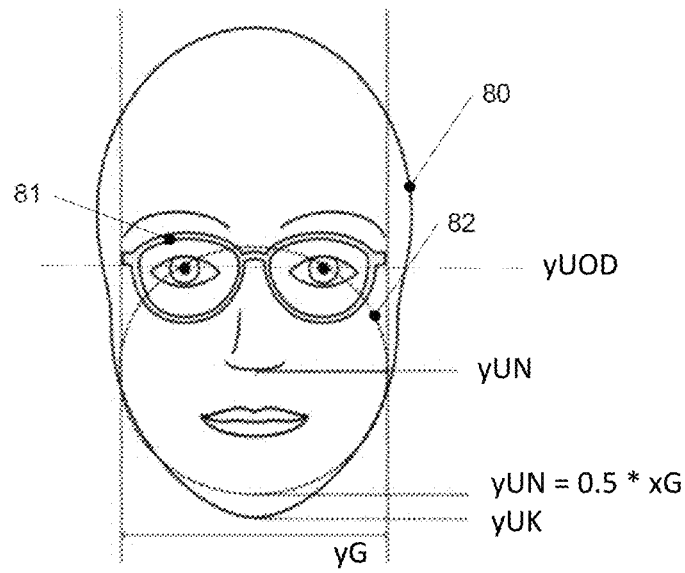
FIG. 8 shows a diagram for explaining auxiliary features.

One example of such an auxiliary feature is illustrated in FIG. 8, which shows a head 80 with a spectacle frame 81. An imaginary circle with a radius of half the width of a face and a center at the lower edge of the nose is denoted by 80. In FIG. 8, yUN denotes the lower edge of the nose, yUK denotes a lower edge of the chin and yUOD denotes a lower edge of the eyes. The width of the face, i.e., the distance between the lines D in FIG. 6, is denoted by yG. An example of a derived auxiliary feature yH which is defined with the aid of a term in the fitting guidelines 70 detected during parsing in step 76 is:

$$yH=(yUK-(yUN-0.5 \cdot xG))/0.5 \cdot xG.$$

This value yH represents a deviation of a calculated chin lower edge of an ideal face from a real chin lower edge as a ratio to half the width of a face and the value is a measure for the vertical length of the face below the nose. Such an auxiliary feature can be used to set the proportions of the lower frame rims of the spectacle frame. As a result of this, it is possible to take account of the fact that the length of the face in the vertical direction may also have an influence on the esthetic impression caused by the spectacle frame and hence that the specific fitting guidelines may predetermine a relationship of the size and/or form of the spectacle frame with respect to the parameter yH.

A further example of a fitting guideline is a position of the pupil within a frame-circumscribing box. This is illustrated in FIG. 10D, which shows the spectacle frame 81 with a frame-circumscribing box 102, for the right eye in this case.

The fitting point height of the pupil (height of the pupil above the lower frame rim) is denoted by y; the horizontal position of the pupil is denoted by x. The width of the box 102 is $\Delta a$ and the height of the box is $\Delta b$. By way of example, the fitting guideline may then provide that, in the horizontal direction, the pupil should be situated between the box center and the nasal golden ratio, i.e., $\Delta a \cdot 3.82 < x < \Delta a \cdot 0.5$. Here, the golden ratio means that the ratio of x to $\Delta a$-x equals the ratio of $\Delta a$-x to $\Delta a$, as is the case for $x = \Delta a \cdot 3.82$. Eye positions closer to the inner side of the frame rim than this golden ratio are generally found to be less esthetic.

As a similar guideline, the eye position in the vertical direction can be set, specifically in such a manner that the pupil is precisely situated, in the vertical direction, between the box center of the box 102 and the value for the golden ratio above the center, i.e., $\Delta b \cdot 0.5 < y < \Delta b \cdot 0.618$.

The fitting guidelines can also be provided directly as a calculation formula, wherein the variables of the calculation formula then are the above-described features. In other words, the frame parameters in the specific fitting guideline can be specified directly as a term, or they can be determined iteratively by way of an optimization loop. In the latter case, a fitting quality defined with the aid of the terms is optimized; the terms set targets—however, these targets are generally not hit; therefore, e.g., an expression in the form "target quantity=term" would only contribute to the fitting quality within the meaning of an optimization e.g. within the meaning of the method of least squares, but would not directly satisfy this.

Parsing in step 76 is implemented, in particular, for the mentioned auxiliary features, for target quantities and calculation prescriptions to this end and, optionally, for a quality value as a scalar quantity, which is available, for example, in the form of a weighted square sum of the deviation from the target quantities and which may optionally have an additional penalty term, as is already described above.

Then, a list of syntax trees for the terms of step 76 is created in step 79.

Accordingly, the position, orientation and dimension for values such as the position of the pupil center, the position and dimension of the eye (e.g., a rectangle describing the eye), the position, orientation and dimension of the nose, the position, orientation and position of the eyebrows and/or the position of the chin are determined in step 78 for the head model.

The terms of the tree are evaluated for the auxiliary features in step 710, i.e., the auxiliary features present are determined, and values for these auxiliary features, for example for the value yH explained above, are determined in step 711. Then, there is an optimization step in step 712. Here, frame parameters of the parametric frame model are varied and the terms are evaluated until target quantities are reached in step 713. From this, a parameter set for a set of frame parameters that were adapted on the basis of the fitting guidelines emerges at 714. In particular, these are parameters with an esthetic effect, for example scaling of the spectacle frame, as worn pantoscopic angle of the spectacle frame and/or a form of the frame rim in the case of a variable frame rim. Further parameters, such as, e.g., angles of nose pads or a length of spectacle earpieces or a bridge width, are initially kept at standard values that are predetermined by the manufacturer. These are then adapted during the anatomical fitting (e.g., step 41 in FIG. 4).

The optimization loop may also comprise virtual donning, e.g., as described in the European patent application EP 3410178 A1. The preceding steps including the adaptation of the parameters of the parametric frame model ensure a convergence of the optimization to an optimal adaptation for a pair of spectacles.

Emerging as a result during the virtual donning there is, firstly, the parameters of geometric motion (six degrees of freedom, see the German Wikipedia article "Bewegung (Mathematik) [Motion (Geometry)]" as of May 22, 2017), presentable, for example, as a rotation matrix and translation vector, and, secondly, the parameters of the bending of the frame. As a rule, the latter is a single parameter for the angle traversed at the ear resting point during bending. This corresponds to virtual donning, as described in the European patent application EP 3410178 A1. The results of the virtual donning described there are the rotation and translation of the frame and the parameters of the deformation of the earpieces.

After donning, all frame-specific features are available in the coordinate system of the head. To this end, geometric motion is applied to the features. By way of example, the position and orientation of the right and left nose pad of the individualized frame—i.e., of the frame corresponding to the parametric frame model with fitted parameters—is calculated. In the ideal case, this position and orientation should correspond with the previously calculated position in the step of adapting the frame-specific parameters, in which the corresponding feature of the nasal wing was brought into correspondence with the feature on the frame, as will still be explained specifically below. However, on account of restrictions to the individualization in the nose region, it may be the case that the process of virtual donning does not yield the same result as the fitting procedure when determining the position of the frame. By way of example, this may be due to asymmetries of the real nose in conjunction with a symmetric nose rest of the frame. However, as a rule, there should only be very minor differences between the positions. In the case of minor differences (e.g., a distance of the nose pad centers of less than 1 mm), this can be ignored. In the case of relatively large differences, the new position following the virtual donning may trigger a new fitting procedure for the parameters to be determined on the basis of the frame-specific fitting guidelines. Feedback in the form of a notification to the operator in respect of a possible incompatibility of the frame model is also possible.

Figures 10A, 10B, 10C:
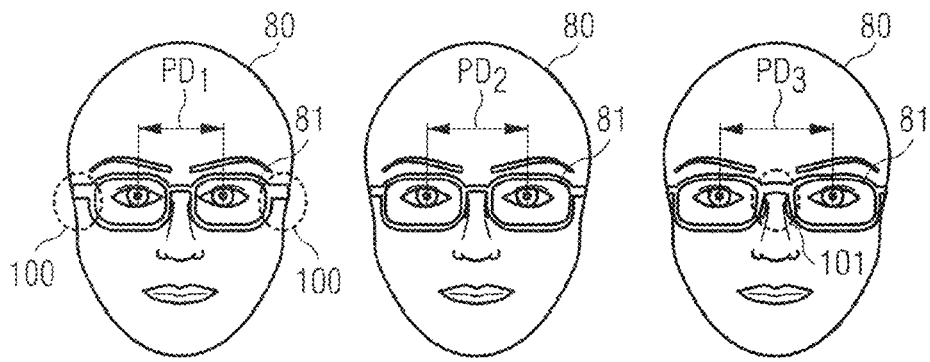
FIGS. 10A to 10D show further schematic views of a head for elucidating a fitting on the basis of fitting guidelines.
Figure 10D:
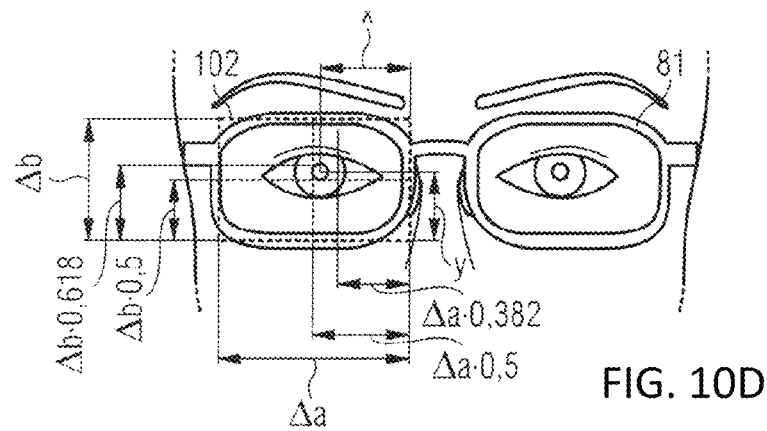

FIGS. 10A to 10C elucidate this positioning of the eye within the box 102 for different interpupillary distances $PD_1$ (FIG. 10A), $PD_2$ (FIG. 10B) and $PD_3$ (FIG. 10C) in the head 80, wherein $PD_1$ is a relatively small interpupillary distance, $PD_2$ is a mid-interpupillary distance and $PD_3$ is a relatively large interpupillary distance. For esthetic adaptation, an outer rim of the frame form 100 is thickened in the case of FIG. 10A and provided with dominant endpieces, for example in order to maintain the condition of the golden ratio. The endpieces are the outer part of the central part of the spectacle frame; the inner part is referred to as bridge. Thus, the modified parameter in this case is the frame form. In the case of FIG. 10C, a dominant region or dominant bridge is chosen, possibly in conjunction with a greater bridge width, in order to obtain a desired esthetic impression.

Figure 9:
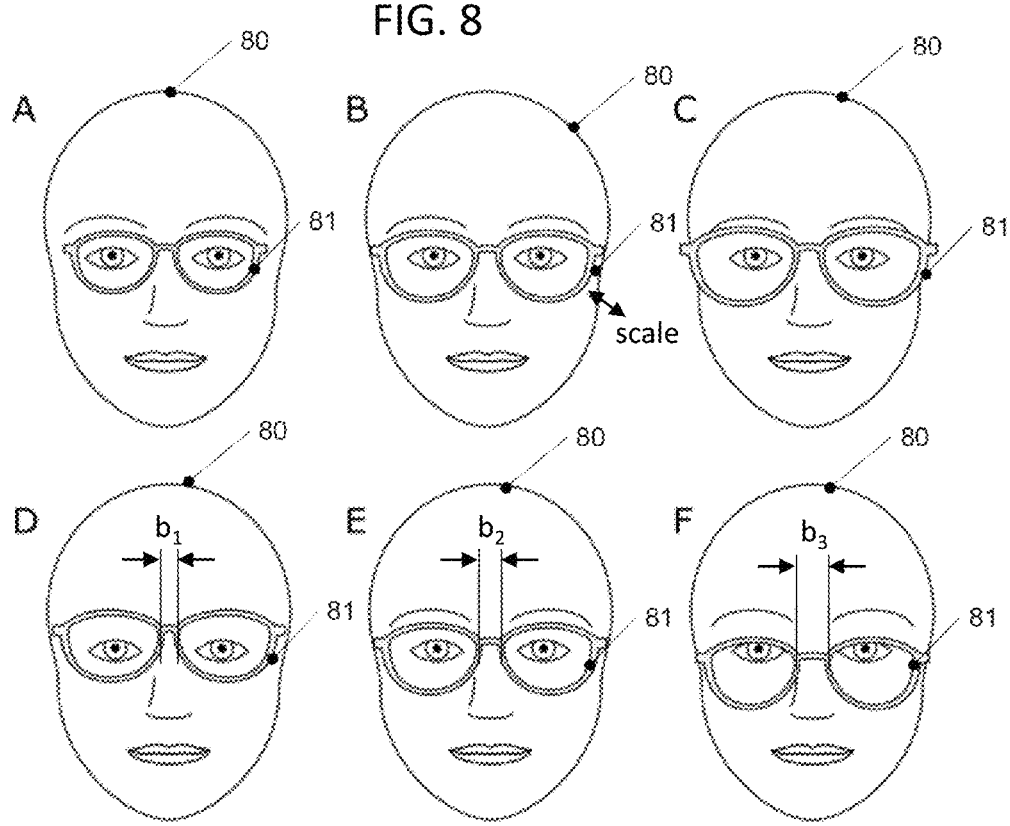
FIGS. 9A-9F show six schematic views of a head for elucidating a fitting.

FIG. 9 shows examples of adapting the parameters on the basis of fitting guidelines for obtaining the desired esthetic effect. Here, FIGS. 9A to 9C show an effect of a scaling of the spectacle frame 81. In FIG. 9A, a very small frame is virtually placed on the person; it is too small according to esthetic and fashion aspects. The frame is too large in FIG. 9C. In FIG. 9B, the frame has a medium size. In order to ensure an esthetically fitting size for the pair of spectacles, the fitting guidelines may prescribe distances between the frame rim and the edge of the face and/or the eyebrows in this case.

FIGS. 9D to 9F show the influence of the bridge width. In the exemplary embodiment described here, the bridge width is set during anatomical fitting in order to ensure an anatomically correct fit of the spectacle frame on the nose, which will be explained in more detail below. However, it may also alter the esthetic impression, which can be additionally taken into account during the anatomical fitting. A small bridge width $b_1$ is chosen in FIG. 9D. Here, the frame sits very high due to a collision with the nasal bridge. The bridge width was slightly widened to a bridge width $b_2$ in FIG. 9E. As a result, the spectacle frame is seated slightly lower and more harmoniously. In the case of FIG. 9F, the bridge width was widened even further to the value $b_3$. Here, care can be taken within the scope of anatomical fitting that the pupils are situated within a predetermined range relative to the frame rims, for example on the basis of the golden ratio.

Consequently, what can be ensured with the aid of the fitting guidelines and the division into fitting on the basis of fitting guidelines followed by fitting to the anatomy of the head is that prescriptions of a spectacle manufacturer, which are of an esthetic nature in particular, can be satisfied.

In the aforementioned method, and also in other methods for fitting a pair of spectacles, for example in the method described in the European patent application EP 3410178 A1 or in some of the methods explained at the outset as prior art, the position of certain points on the 3D model of the head is required and/or metadata are required, which metadata characterize certain regions for fitting the spectacles, such as a resting point or an ear resting region. One option lies in determining such points or regions manually or by means of the pattern recognition method. A further option will now be described with reference to FIGS. 11 to 15.

Figure 11:
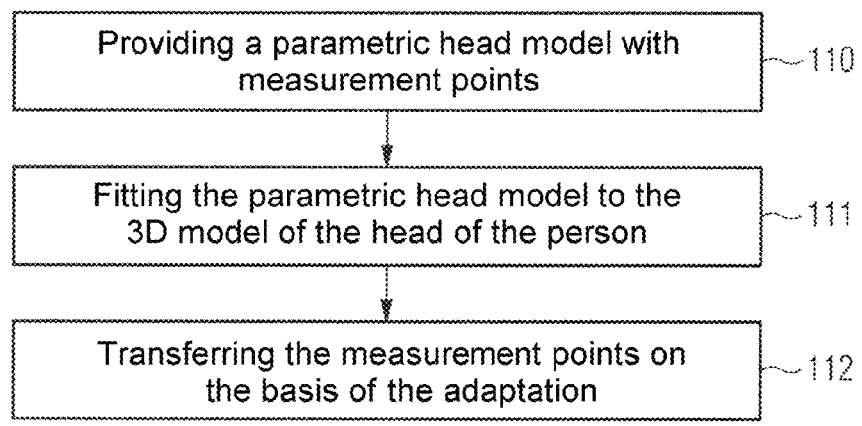
FIG. 11 shows a flowchart of a method according to one exemplary embodiment, which is usable within the scope of the method of FIG. 3.

FIG. 11 shows a method for setting measurement points onto the 3D model of the head of the person according to one exemplary embodiment. Here, measurement points should be understood to mean points which can be used for the above-described methods, such as, e.g., points which describe facial features such as ears, eyes, eyebrows, and the like.

In step 110, a parametric head model with measurement points is provided. Here, a parametric head model is a parametric model that describes a head. Changing the parameters of the parametric model changes the head form described by the head model. The term parametric head model, as used here, also includes models that only describe part of the head, for example only the parts required for fitting spectacles (in particular, the region of the eyes, nose and ears). An example of a parametric head model is explained below with reference to FIGS. 13A and 13C. Measurement points are set on this parametric head model, for example by manual selection. Examples of such measurement points are likewise explained below with reference to FIGS. 13A and 13C.

Then, in step 111, the parametric head model is fitted to the 3D model of the head of the person. To this end, use can be made of any conventional optimization methods that adapt the parameters of the parametric head model in such a way that there is the smallest possible deviation between the parametric head model and the 3D model of the head of the person (e.g., by means of the least-squares method or the method in the article by J. Booth et al., cited above). Then, in step 112, the measurement points are transferred to the 3D model of the head of the person on the basis of the adaptation. In other words, the position of the measurement points on the fitted parametric head model is used to set corresponding measurement points on the 3D model of the head. This can be implemented by projection from the parametric head model to the 3D model of the head, for example by virtue of a point of intersection of a normal vector, i.e., a vector perpendicular in the case of the measurement point on the parametric head model, with the 3D model of the head being used. In accurate models, it is also possible to use the position of the measurement point on the parametric head model directly as a position on the 3D model of the head.

In this way, it is possible to determine measurement points for substantially any 3D model of any head, with the measurement points only having to be set once on the parametric head model.

Figure 12:
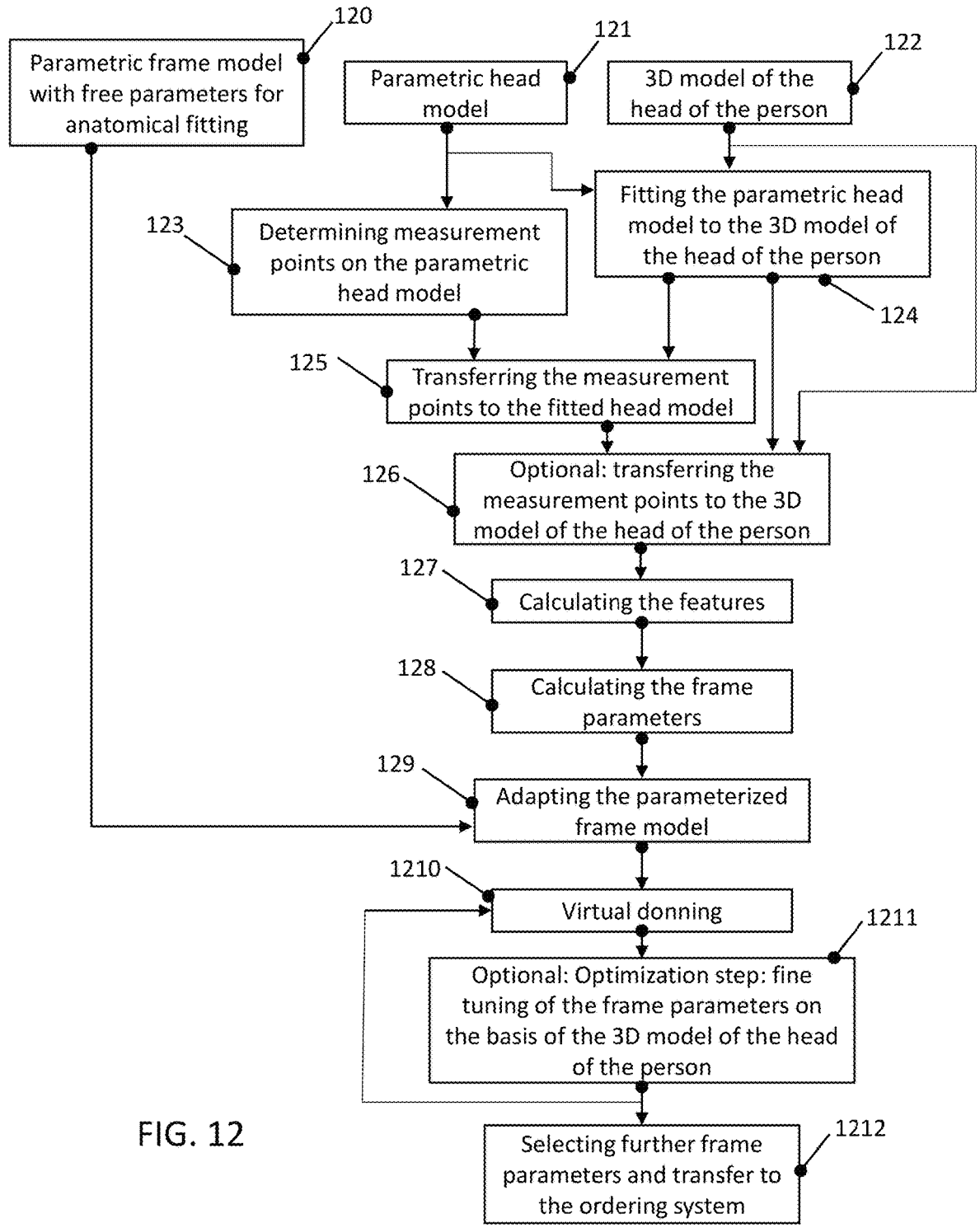
FIG. 12 shows a flowchart of a detailed implementation of the method of FIG. 11.

FIG. 12 shows a more detailed method, which uses a parametric head model for setting measurement points on a 3D model of the head of a person, embedded in a method for virtual fitting of a pair of spectacles. Instead of the method for virtual fitting of the pair of spectacles in FIG. 12, the methods explained above with reference to FIGS. 1 to 10 may also serve as a possible application for the method of FIG. 11.

In FIG. 12, a parametric frame model with free parameters is provided in step 120. The free parameters in the case of the exemplary embodiment in FIG. 12 serve for anatomical fitting. In other exemplary embodiments, there can be an additional adaptation by means of frame-specific fitting guidelines, as explained above.

In step 121, a parametric head model is provided. The parametric head model can be a face model or head model determined on the basis of principal component analysis (PCA), as described in, e.g., A. Brunton, A. Salazar, T. Bolkart, S. Wuhrer, "Review of Statistical Shape Spaces for 3D Data with Comparative Analysis for Human Faces," Computer Vision and Image Understanding, 128:1-17, 2014, or else a head model as described in J. Booth, A. Roussos, S. Zafeiriou, A. Ponniah and D. Dunaway "A 3D Morphable Model learnt from 10,000 faces," 2016 IEEE Conference on Computer Vision and Patent Recognition (CVPR), Las Vegas, Nev. 2016 pages 5543-5552 doi:10.1109/CVPR.2016.598. In step 122, a 3D model of the head of the person is provided, which model may have been created by the camera device of FIG. 2, for example.

In step 123, measurement points are determined on the parametric head model. An example of such a 3D model of at least a part of the face is presented together with coordinate axes in FIG. 14.

In step 123, measurement points are determined on the parametric head model. To this end, a so-called standard head of the parametric head model is provided. A standard head is a head in which the parameters of the parametric head model assume predetermined standard values. In the case of a head model on the basis of principal component analysis, this may be an average head, for example, which corresponds to a first component of the principal component analysis.

Figure 13A:
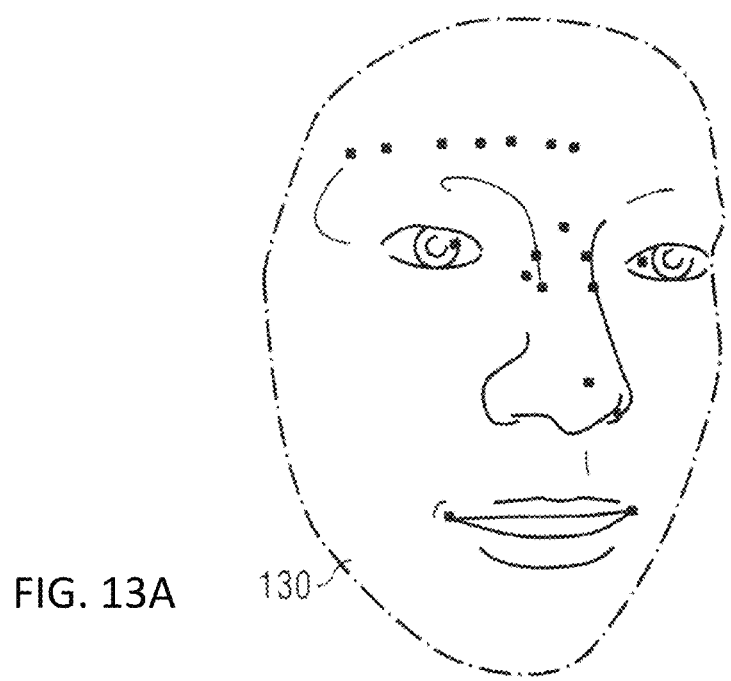
FIGS. 13A to 13D show illustrations for elucidating head models.
Figure 13B:
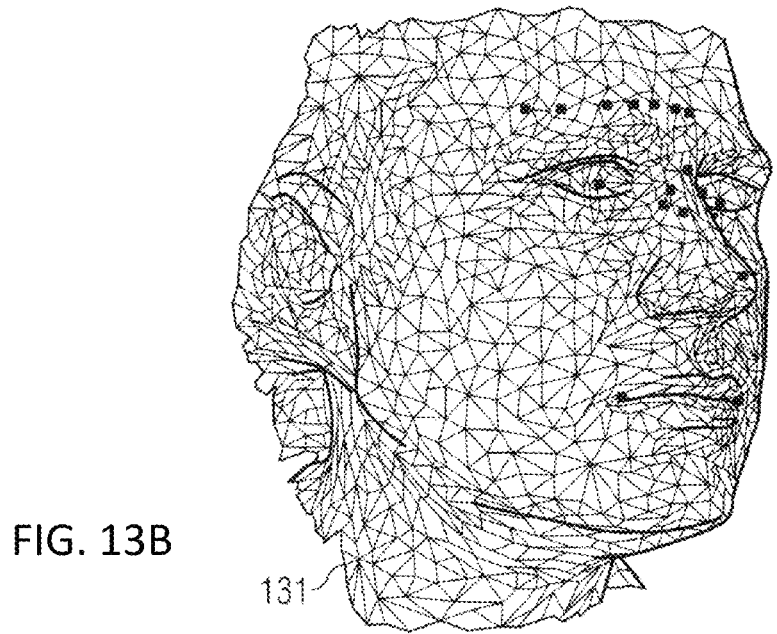
Figure 13C:
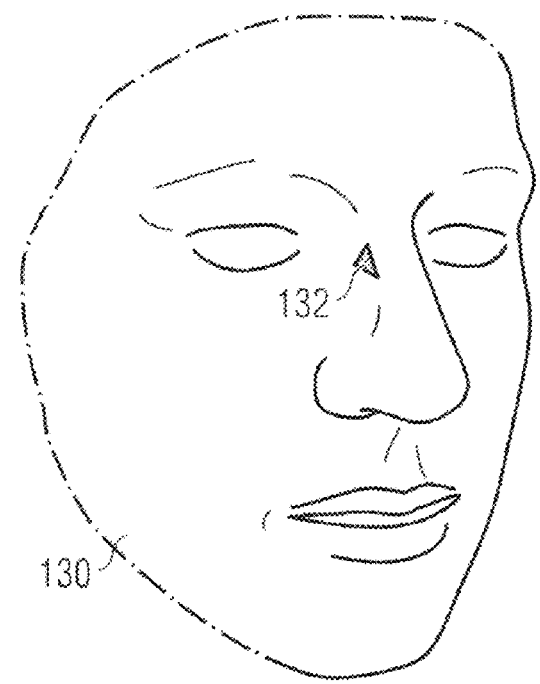

In step 123, measurement points are set on the parametric head model. This can take place manually by setting points. An example for such a stipulation is shown in FIG. 13A. Here, a multiplicity of points have been set on a standard head 130 of the parametric head model, for example corner of the mouth, tip of the nose, points along a forehead wrinkle, eye points, nasal bridge and points on the nasal wings. A further example is shown in FIG. 13C. Here, a triangle 132, i.e., three points, is marked on a nasal wing of the head model 130.

In step 124, the parametric head model is fitted to the 3D model of the head of the person using the fitting process. A fitting process is a process in which parameters of the parametric head model are determined in such a way that the parametric head model is fitted as accurately as possible to the 3D model of the head of the person, for example according to the least squares criterion. The steps 123 and 124 can be carried out in any sequence. Step 123 need only be carried out once before the method is carried out, and so the determined measurement points can be used every time the method is carried out for different 3D models of heads of different persons and for different parametric frame models.

Figure 13D:
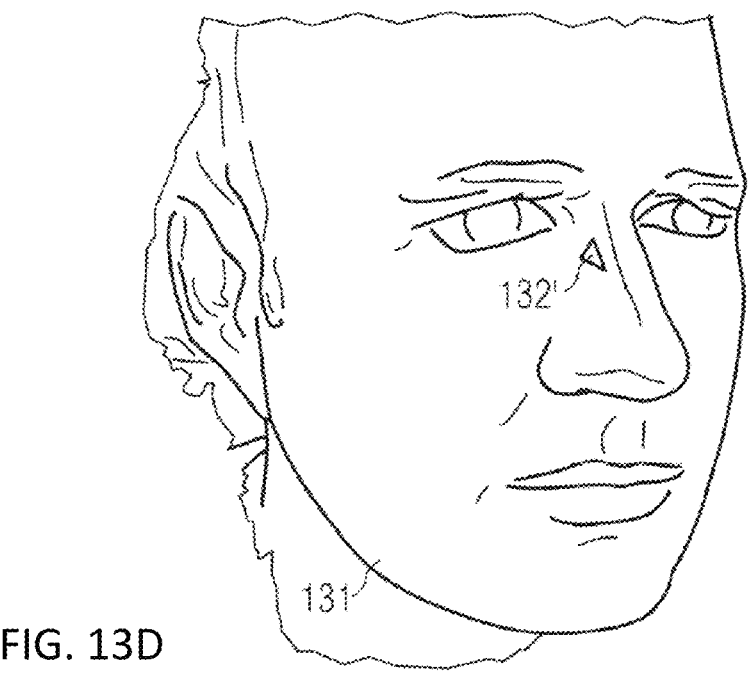

Then, in step 125, the measurement points are transferred to the fitted parametric head model. In other words, the position of the measurement points is determined on the fitted head model. To this end, substantially the same transformation, which is used to arrive at the fitted parametric head model from the standard head model, on which the measurement points were determined in step 123, is applied to the measurement points, for example as described in the aforementioned article by J. Booth et al. Optionally, in step 126, the measurement points are transferred to the 3D model of the head. Whether step 126 is used depends on the accuracy of the employed model, i.e., on how accurately the fitted parametric head model corresponds to the 3D model of the head of the person. By way of example, step 126 can be omitted if the mean square deviation lies below a threshold value. The transfer of the measurement points from the fitted parametric head model to the 3D model of the head of the person can be implemented by a projection, in which a normal vector is determined through the respective measurement point on the fitted head model and the point of intersection of this normal vector with the 3D model of the head of the person is then used as a corresponding measurement point on the 3D model of the head of the person. Examples are shown in FIGS. 13B and 13D. In FIG. 13B, the points of FIG. 13A are projected onto a 3D model 131 of the head of the person and, in FIG. 13D, the triangle 132 of FIG. 13C is projected onto the 3D model 131 as a triangle 132'.

Figure 14:
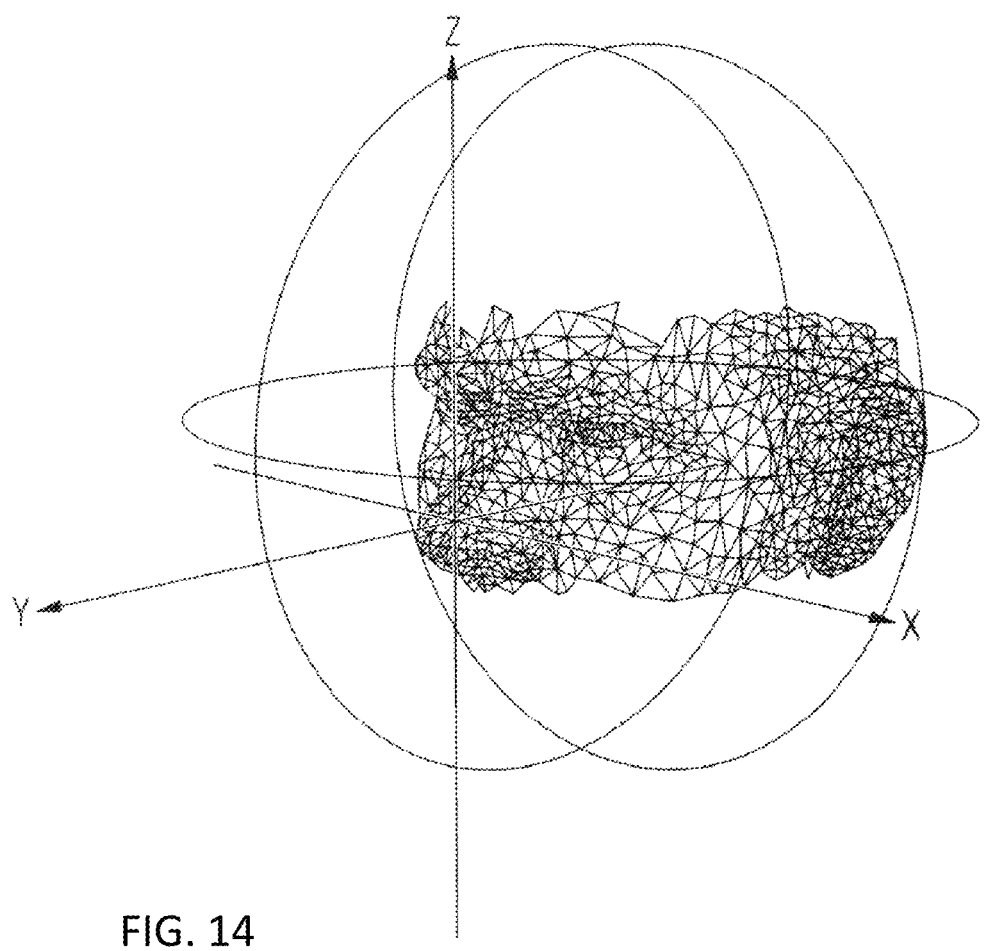
FIG. 14 shows another illustrations for elucidating head models

This projection operates reliably in the case of many facial models since parametric models often have great smoothness, in particular a greater smoothness than a typical 3D model of the head as illustrated in FIG. 14. Here, the smoothness of surfaces can be defined as a measure of the local deviation of the normal vectors. Alternatively, the local deviation of the point cloud of the 3D model of the head from an approximating polynomial surface may also be defined as a measure, for example in local regions with a diameter of 5 mm in each case. Polynomial surfaces are differentiable infinitely many times and consequently referred to as "smooth" in differential geometry. Local smoothing by means of "moving least squares" (MLS), which may be applied in exemplary embodiments, is described at the url: pointclouds.org/documentation/tutorials/resampling.php, as of Jun. 8, 2017.

Moreover, a manual step can be used (not illustrated in FIG. 12) to mark further measurement points on the 3D model of the head. In particular, these may be points that are not readily detected by the 3D model, for example parts of the person covered by hair. In particular, this may be the case for ears. Therefore, these points are then not accurately identifiable in the 3D model of the head of the person and the points can be added manually. An example of such a measurement point is a resting point of the spectacle earpiece on the base of the ear.

Then, in step 127, features are calculated on the basis of the measurement points (the measurement points at the fitted head model if step 126 is dispensed with or the transferred measurement points when step 126 is carried out). These features, also referred to as measurement features, are based on groups of measurement points and define a region of the head, for example.

The features can be ascertained by means of the direct calculation (e.g., 3 non-collinear points in space uniquely define a plane, the normal vector of which can be calculated by means of the cross product of the normalized difference vectors; 4 non-coplanar points define a sphere, 5 non-coplanar points define a cylinder) or by means of an approximation of a geometric primitive (points, lines or areas) such as a plane or sphere or cylinder to certain measurement points. Then, the feature is determined by the parameters of the adapted geometric primitives, for example by normal vectors and point under consideration of a plane in the case of a plane or by a center and radius of a sphere in the case of a sphere, etc. Examples of such features, which are calculated in step 127, are specified below:

Left or Right Nasal Wing

For the left or right nasal wing of the nose, a plane (e.g., corresponding to the triangle 132' in FIG. 13D), which is defined by the approximation to a small region of the model in the region of the nose support or the region for the nose pads (e.g., with a diameter of 6 mm), can be used as a feature. The horizontal and vertical nasal wing angle emerge from the position and orientation of the plane. Here, the plane is intersected by the coordinate axes in the center point of the region of the nose support and the arising angle is measured in each case. By way of example, if the three points, corresponding to the triangle 132, are marked on each nasal wing in FIG. 13C, the plane can be calculated from the three points. In the case of more than three points, the plane can be calculated by an adaptation process, for example by way of principal component decomposition on the set of points, or by way of an adaptation with the aid of the least-squares method. As mentioned above, a single plane is representable by a point (x, y and z) in the plane and a normal vector (nx, ny, nz) through this point, with x, y and z being Cartesian coordinates. Therefore, both nasal wings together can be represented as a 12-tuple, i.e., by 12 values (2 points and 2 normal vectors), for example as $(x_{[N,OD]}, y_{[N,OD]}, z_{[N,OD]}, nx_{[N,OD]}, ny_{[N,OD]}, nz_{[N,OD]}, x_{[N,OS]}, y_{[N,OS]}, z_{[P,OS]}, nx_{[N,OS]}, ny_{[N,OS]}, nz_{[N,OS]})$ Here, the index N denotes the nose, the index OD denotes the right eye (oculus dexter) and the index OS denotes the left eye (oculus sinister).

Curvature of the Forehead

Here, a section of a circular curve in space can be fitted to measurement points on the forehead, as illustrated in FIGS. 13A and 13C. Parameters of this fit are the center, radius and normal vector of a plane in which the circle lies. This adaptation can be carried out in two steps. Initially, a plane is adapted, as described above for the nasal wings, and then a circle is still adapted in the plane. This adaptation of the circle can take place, for example, by means of a least-squares method or any other conventional fitting method.

Eyebrows and/or Cheekbones

Here, a spline surface S (see the German Wikipedia article "Spline", as of May 23, 2017) or a bivariate polynomial (see, e.g. the url: en.wikipedia.org/wiki/Polynomial#Definition→"bivariate polynomial", as of Jun. 8, 2017) is fitted in a region around the eyebrows and/or in a region about the cheekbones to the measurement points in the region of the eyebrows and in the region of the cheekbones. In a spline representation $$S_{(c1,\ldots,cn)}:(x,z)\to y,$$

coefficients (c1, . . . , cn) of the spline function S are determined in such a way here that for a set of measurement points {(x1,y1,z1), . . . , (xm,ym,zm)} in the corresponding region (eyebrows or cheekbones), a root mean square error F is minimal, i.e., the error F has the following form:

$$F(c1,\ldots,cn)=\Sigma_{i=1\ldots m}(yi-S_{(c1,\ldots,cn)}(xi,zi))^2.$$

In this representation, the assumption is made that the process of donning the frame is implemented later by a movement parallel to an xy-plane with, in each case, a fixed y-value in the coordinate system of FIG. 14. If a minimum distance between a back frame rim and the 3D model of the head should be realized by the fitting process, this distance value can be provided in advance as an offset from the spline surface. Then, contact can be detected through correspondence in the y-values (since the y-value is stored in advance as an offset). To this end, each vertex of the back frame rim can then be examined during the later adaptation of the spectacle frame, and a respective vertex, given by the coordinates (x, y, z), is examined in respect of the difference $\Delta y = y - S_{(c1, \ldots, cn)}: (x, z)$. Should the vertex be detected to contact or be immersed in the model, then a position of the spectacle frame can be adapted or the frame rim of the spectacle frame can be modified.

Point at the Base of the Ear that serves as a Resting Point for the Spectacle Earpiece To this end, a single point on the head model can be used; i.e., no measurement points need to be combined in this case. In other exemplary embodiments, an ear resting curve can be determined as described in the European patent application EP 3410178 A1. Should use be made of a model without modeling of the ears (see above), for example a pure facial model, or should the ears have been covered when creating the 3D model of the head of the person, this point at the base of the ear can be generated differently, for example by way of machine learning from images that were used for the creation of the 3D model of the head, wherein a trained feature detector can be used to this end for the purposes of detecting the point at the base of the ear in the images. These points detected in the 2D image are projected onto the 3D model of the head in a further step. Information in respect of such projections is found in background literature in respect of projective geometry and camera calibration, e.g., Hartley and Zisserman, "Multiple View Geometry in Computer Vision," 2000, from page 7 for the representation of the image pixels as straight lines in space; projection onto a 3D model in space as a calculation of the front-most point of intersection of the triangular mesh with the straight line, also referred to as "ray casting;" see also, e.g., the software library "vtk", function "vtkModifiedBSPTree:IntersectWithLine". Alternatively, such a point can also be determined manually, as explained above.

In some exemplary embodiments, certain points such as eye position or pupil position can also be determined by a separate method, for example by means of pupil detection and cornea detection using the images recorded by the camera of FIG. 2. Such determinations are described in the European patent applications EP 3354190 A1 and 17153559.4.

On the basis of the features calculated thus in step 127, frame parameters of the parametric frame model are then calculated in step 128. An example for this calculation is provided below. However, the features can also be used for the frame fitting, described above, on the basis of specific fitting guidelines or for the virtual donning, as described in the European patent application EP 3410178 A1.

In general, for fitting purposes, the features are evaluated in combination in respect of the relative position and orientation and/or of further properties such as angle or curvature. Some examples for the calculation of the frame parameters in step 128 are described below. These may also serve as an example for the anatomical fitting of step 41 in FIG. 4.

Bridge Width

The bridge width is defined in DIN EN ISO 8624:2015-12, appendix A and emerges from the relative position of the nose pads since the nose pads lie further apart from one another in the case of a greater bridge width and the nose pads lie closer together in the case of a narrower bridge width. In the case of a spectacle frame without nose pads, generalized nose pads are defined as specific regions of the nose rest, which are provided as contact regions with the nose. The bridge width arises as the spacing of the center points of these generalized nose pads. Thus, the bridge width can correspond to the spacing of center points of triangles on both nasal wings that correspond to the triangle 132' in FIG. 13D. Here, the geometric centroid, i.e., the point of intersection of the angle bisectors, can be taken as the center point of the triangle.

Figure 16:
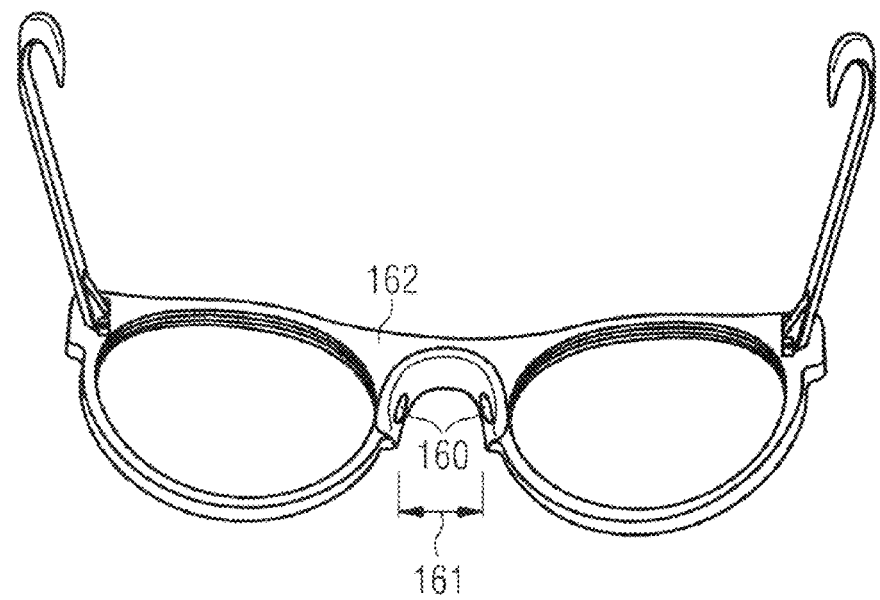
FIG. 16 shows a view of a frame model for elucidating a bridge width.

For elucidation purposes, FIG. 16 shows a perspective view of a parametric frame model with nose pads 160 (within this sense) and the bridge width 161.

Relative Position and Angle of the Nose Pads

Figure 15:
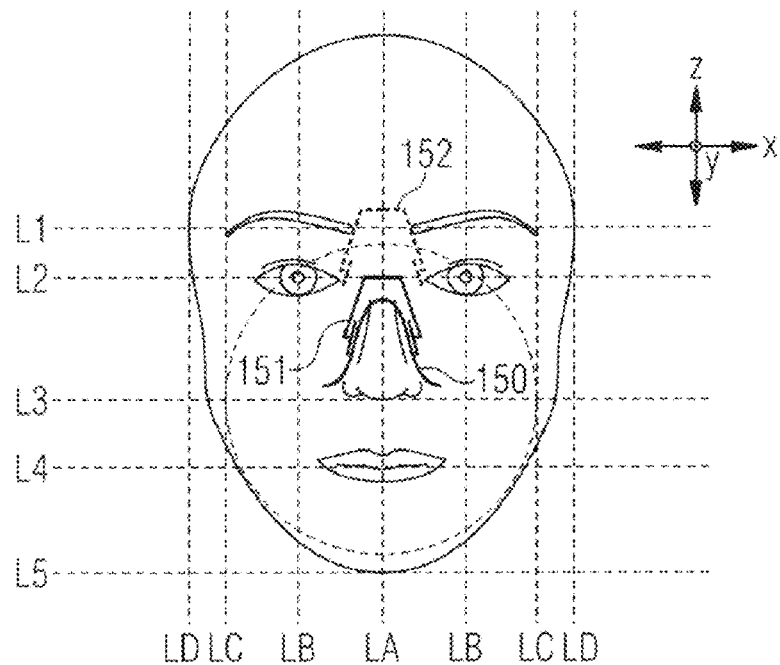
FIG. 15 shows a diagram for elucidating a partial step of fitting a pair of spectacles in the method of FIG. 12.

This adaptation is explained in FIG. 15. Here, the nasal wings are presented as a cross section. This is represented by a curve 150 and a nose pad 151 is adapted.

Each of the two nose pads can be adapted by a plane that contacts the respective nose pad (tangential plane). As described for other planes above, this plane of the nose pad can be approximated by a point under consideration $(x_P, y_P, z_P)$ and a normal vector (nx, ny, nz). In particular, the point under consideration can be a center of the nose pad. In the case of the nose pads in the conventional sense, i.e., in the case of metal frames, this center point is defined, e.g., by a projection of the centroid of the nose pad on the outer side, i.e., the contact face of the pad with the nose—wherein the pad center can also be part of the parameterizable frame model as a predefined point—i.e., this point is supplied together with the model. In the case of plastic frames without separate pads, the part of the frame envisaged as a contact area for the nose (160 in FIG. 16) is referred to as nose rest or, in generalized fashion here, as a nose pad. Consequently, the two nose pads can likewise be represented as a 12-tuple, with the representation being implemented in the local coordinate system of the frame in the present exemplary embodiment: $(x_{[P,OD]}, y_{[P,OD]}, z_{[P,OD]}, nx_{[P,OD]}, ny_{[P,OD]}, nz_{[P,OD]}, x_{[P,OS]}, y_{[P,OS]}, z_{[P,OS]}, nx_{[P,OS]}, ny_{[P,OS]}, nz_{[P,OS]})$, where the index P represents the nose pad.

As explained above, the position and orientation of the nose pads then also implies the bridge width.

In this representation of the nose pads, the coordinate origin and the orientation of the coordinate system can be chosen freely because the 12-tuple is transferable into any desired coordinate system by way of a common translation mapping of the points under consideration, or by way of a common rotation mapping of the points under consideration and normal vectors. The precondition is that all parameters of the aforementioned 12-tuple are in fact freely selectable in the parametric frame model. In practice, the parameters are subject to restrictions in a parametric frame model and there are maximum and minimum values for the individual parameters of the parametric frame model (by way of example, a frame cannot have an arbitrarily large size or cannot be manufactured with an arbitrarily large or arbitrarily small bridge width). In any case, both the nose pads and, as mentioned above, the nasal wings can be represented as 12-tuples.

Instead of in Cartesian coordinates as above, the normal vectors can be represented in each case by two angles theta and phi in space (substantially a representation in polar coordinates, wherein 1 is selected as a length (radius) of the normal vector:

$$(nx, ny, nz) = (\sin(phi)*\sin(theta), \cos(phi)*\sin(theta), \cos(theta)).$$

Hence, a total of 10 degrees of freedom then arise for the pads (and hence also for the nose bridge) together; a representation as a 10-tuple is obtained: $(x_{[P,OD]}, y_{[P,OD]}, z_{[P,OD]}, theta_{OD}, phi_{OD}, x_{[P,OS]}, y_{[P,OS]}, z_{[P,OS]}, theta_{OS}, phi_{OS}) = z_{[P,OS]}$.

The relationship between nasal bridge width and the position of the nose pads is evident from FIG. 15: If the nasal bridge is broadened, there is an enlargement in the distance between the points under consideration of the planes of the left and right pad accordingly, and vice versa.

A reduction in the number of parameters occurs if the assumption is made that the bridge is symmetrical and the nose pads are symmetrical with respect to one another. With the yz-plane of FIG. 14 as plane of symmetry, the following applies:

i. $x_{[P,OS]} = -x_{[P,OD]}$
  ii. $y_{[P,OD]} = y_{[P,OS]}$ and $z_{[P,OD]} = z_{[P,OS]}$
  iii. $theta_{[P,OD]} = theta_{[P,OS]}$ and $phi_{[P,OD]} = -phi_{[P,OS]}$.

Then, (w, $y_P$, $z_P$, theta, phi) arise as free parameters, with $theta = theta_{[P,OD]} = theta_{[P,OS]}$ and $phi = phi_{[P,OD]} = -phi_{[P,OS]}$. Here, w is the bridge width, where $x_{[P,OD]} = w/2$ and $x_{[P,OS]} = -w/2$ applies. Consequently, five free parameters are present in the symmetric case, which free parameters can be used to adapt the parametric frame model. Depending on the frame, fewer degrees of freedom may be present or the degrees of freedom may be restricted by means of specific fitting guidelines, as explained above.

In order to fit the parametric frame model to the 3D model of the head, the planes of the nose pads may be chosen in such a way that they correspond to the planes of the nasal wings; i.e., in general, the 12-tuples for the nose pads correspond to the 12-tuple for the nasal wings.

By way of example, as a restriction, the position of the bridge or of the nose pads can be fixed in the local coordinate system of the frame (i.e., the values $y_P$, $z_P$ are fixed), or a fixed and, e.g., linear relationship can be chosen between theta and phi such that theta and phi cannot be chosen independently of one another.

In the case of a reduced set of frame parameters, for example in the aforementioned symmetric case, use can be made of averaging. By way of example, if the corresponding angles $theta_{[P, OD]}$ and $theta_{[P, OS]}$ for the nasal wings differ, use can be made of a mean value. Should the difference between the angles be greater than a threshold, a warning to the effect of the symmetric frame form yielding disadvantageous wearing properties in this case can be output. A quality measure that denotes the anatomical fit quality can be used to assess how disadvantageous the wearing properties are. Such a quality measure can be calculated on the basis of the aforementioned distances of the spectacle frame from regions of the head, wherein different distances may be included in the quality measure with different weightings.

Depending on the type of parametric frame, the number of free parameters can be reduced further, for example to two parameters in the region of the nose support, specifically the bridge width and a parameter for the bridge angle. By way of example, the bridge angle is explained in Johannes Eber, "Anatomische Brillenanpassung," Verlag Optische Fachveröffentlichung GmbH, 1987, page 26, FIG. 24 in respect of the bridge angle.

Pantoscopic Angle of the Frame

Moreover, the pantoscopic angle of the frame (also referred to as as worn pantoscopic angle) can be calculated or adapted by means of the features. In exemplary embodiments in which use is made of frame-specific fitting guidelines as explained above, the pantoscopic angle can already be set during this fitting (step 40 in FIG. 4). The latter can then be adapted further in step 128 of FIG. 12. To this end, a distance is calculated between the frame rim (e.g., the back edge of the lower boundary of the frame rim, left or right bottom corner in a frontal view of the frame) and the aforementioned cheek surfaces, which may be represented by a spline surface. Then, the pantoscopic angle is amended in such a way that a predetermined minimum distance, e.g., 2 mm, is ensured.

Earpiece Length

The earpiece length is calculated in step 128 once the fit of the frame on the nose has been set, for example by way of the aforementioned nose pads. For the purposes of setting the earpiece length of the frame (provided this is a free parameter of the parametric frame model), a front resting point of the earpiece is made congruent with the aforementioned points at the base of the ear.

Then, in step 129, the frame parameters calculated in step 128 are applied to the parametric frame model. In step 1210, there is then virtual donning and rendering, as described with reference to step 56 in FIG. 5. Optionally, a further optimization can take place in step 1211, for example an optimization as described in US 2016/0327811 A1, mentioned at the outset, or a manual adaptation as described in step 57 in FIG. 5. Then, there is a transfer to the ordering system in step 1212. It is also possible to select further frame parameters, for example a color of the central part of the spectacle frame, a color of the spectacle earpieces of the spectacle frame, a material and color of the hinge of the spectacle frame, engravings on the spectacle earpieces of the spectacle frame, design elements, applications to the spectacle earpieces or central part of the spectacle frame. Then, the ordered spectacle frame is manufactured according to the determined parameters, for example using an additive manufacturing method, as explained at the outset.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for fitting of a pair of spectacles, the method comprising:
    virtually fitting a parametric frame model to a 3D model of a head of a person by:
        performing a first fitting procedure including adapting parameters of the parametric frame model for fitting the parametric frame model to the 3D model of the head to satisfy fitting guidelines that are specific to the parametric frame model;
        performing a second fitting procedure including adapting the parameters of the parametric frame model for an anatomical fitting of the parametric frame model to the 3D model of the head;
        determining a first set of parameters in the first fitting procedure;

determining a second set of parameters that differs from the first set of parameters in the second fitting procedure,
wherein the first set of parameters includes at least one of a scaling of the spectacle frame, an as-worn pantoscopic angle, or a form of a spectacle rim of the spectacle frame, and
wherein the second set of parameters includes at least one of a bridge width, an earpiece length, or a nasal wing angle, and
wherein adapting the parameters of the parametric frame model changes a geometry of a spectacle frame defined by the parametric frame model; and
performing a virtual donning of the parametric frame model having the changed geometry.

2. The method as claimed in claim 1, further comprising: converting at least one of the fitting guidelines or the parametric frame model into a predetermined format.

3. The method as claimed in claim 1, wherein the parametric frame model comprises a multiplicity of parameters.

4. The method as claimed in claim 1, wherein the specific fitting guidelines comprise specifications for features derived from features of the frame, features of the head, or features of the frame and the head.

5. The method as claimed in claim 1, wherein the first fitting procedure employs a syntax tree.

6. The method as claimed in claim 1, wherein the first fitting procedure comprises an optimization process in a target function on a basis of at least one of a deviation of a target value of the specific fitting guidelines or a penalty term when a target range is exceeded.

7. The method as claimed in claim 1, wherein the first fitting procedure comprises a repeated run-through of an optimization loop.

8. The method as claimed in claim 1, wherein the first fitting procedure comprises taking into account a weight of a spectacle lens.

9. The method as claimed in claim 1, wherein at least one of the parametric frame model or the specific fitting guidelines are encrypted.

10. The method as claimed in claim 1, further comprising a calculation of a quality measure for the virtual fitting.

11. The method as claimed in claim 1, further comprising:
creating a subset of parameters from the parameters of the parametric frame model;
keeping the parameters of the subset at a standard value during the first fitting procedure; and
adapting the subset of parameters during the second fitting procedure.

12. A computer comprising:
a processor; and
a non-transitory storage medium having a program stored thereon and comprising a program code which causes the method as claimed in claim 1 to be carried out when the program code is executed on the processor.

13. An apparatus for virtual fitting of a pair of spectacles, comprising a processor and a memory, in which the computer program as claimed in claim 12 is stored for the purpose of being executed on the processor.

14. A non-transitory computer-readable storage medium comprising instructions that, upon execution by a computer, cause the latter to carry out the method as claimed in claim 1.

15. An apparatus for data processing, comprising a processor configured to carry out the method as claimed in claim 1.

16. A computer-implemented method for fitting of a pair of spectacles, the method comprising:
virtually fitting a parametric frame model including a multiplicity of parameters to a 3D model of the head of a person by:
performing a first fitting procedure including fitting the parametric frame model to the 3D model of the head to satisfy fitting guidelines that are specific to the parametric frame model and determining a first set of parameters, wherein the first set of parameters includes at least one of a scaling value of the spectacle frame, an as-worn pantoscopic angle, or a form of a spectacle rim of the spectacle frame;
performing a second fitting procedure including an anatomical fitting of the parametric frame model to the 3D model of the head and determining a second set of parameters that differs from the first set of parameters,
wherein the second set of parameters includes at least one of a bridge width, an earpiece length, or a nasal wing angle,
wherein the specific fitting guidelines comprise at least one of a target value or a target range for a distance between a feature of the spectacle frame and a feature of the head of the person, and
wherein determining the parameters of the first set of parameters and the second set of parameters changes a geometry of a spectacle frame defined by the parametric frame model; and
performing a virtual donning of the parametric frame model having the changed geometry.

17. The method as claimed in claim 16, wherein the at least one of the target value or the target range differs for different spectacle frames.

18. The method as claimed in claim 16, further comprising:
creating a subset of parameters from the parameters of the parametric frame model;
keeping the parameters of the subset at a standard value during the first fitting procedure; and
adapting the subset of parameters during the second fitting procedure.

19. A computer comprising:
a processor; and
a non-transitory storage medium having a program stored thereon and comprising instructions that, upon execution of the program by a computer, cause the latter to carry out the method as claimed in claim 16.

20. A non-transitory computer-readable data medium, on which the computer program as claimed in claim 19 is stored.

21. An apparatus for data processing, comprising:
a processor; and
means for carrying out the method as claimed in claim 16.

22. An apparatus for data processing, comprising:
means for virtually fitting a parametric frame model to a 3D model of a head of a person, wherein the means for virtual fitting include:
means for carrying out a first procedure for fitting the parametric frame model to the 3D model of the head to satisfy fitting guidelines that are specific to the parametric frame model;
means for carrying out a second procedure for fitting the parametric frame model to the 3D model of the head for anatomical fitting;
means for determining a first set of parameters in the first fitting procedure;

means for determining a second set of parameters that differs from the first set of parameters in the second fitting procedure, wherein the first set of parameters includes at least one of a scaling of the spectacle frame, an as-worn pantoscopic angle, or a form of a spectacle rim of the spectacle frame, wherein the second set of parameters includes at least one of a bridge width, an earpiece length, or a nasal wing angle, and wherein the first procedure for fitting the parametric frame model and the second procedure for fitting the parametric frame model change a geometry of a spectacle frame defined by the parametric frame model; and means for performing a virtual donning of the parametric frame model having the changed geometry.

* * * * *

UNITED STATES PATENT AND TRADEMARK OFFICE
CERTIFICATE OF CORRECTION

| | | |
|---|---|---|
| PATENT NO. | : 11,215,850 B2 | Page 1 of 1 |
| APPLICATION NO. | : 16/908473 | |
| DATED | : January 4, 2022 | |
| INVENTOR(S) | : Schwarz et al. | |

It is certified that error appears in the above-identified patent and that said Letters Patent is hereby corrected as shown below:

In the Specification

In Column 8, Line 23, change "therefore" to – therefor –

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*